(12) United States Patent  (10) Patent No.: US 7,885,742 B2
Yamazaki  (45) Date of Patent: Feb. 8, 2011

(54) STEERING DEVICE OF VEHICLE

(75) Inventor: Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/755,806

(22) Filed: Apr. 7, 2010

(65) Prior Publication Data

US 2010/0250068 A1    Sep. 30, 2010

Related U.S. Application Data

(63) Continuation of application No. PCT/JP2009/056777, filed on Mar. 25, 2009.

(51) Int. Cl.
*G06F 19/00*    (2006.01)

(52) U.S. Cl. ............... 701/41; 180/410; 702/85; 702/109; 340/465; 700/41

(58) Field of Classification Search .......... 701/41, 701/42, 44; 180/410; 702/85, 109; 340/465, 340/475; 700/41–44
See application file for complete search history.

(56) References Cited

U.S. PATENT DOCUMENTS

| | | | | |
|---|---|---|---|---|
| 4,313,514 | A * | 2/1982 | Furukawa et al. | 180/446 |
| 5,097,917 | A * | 3/1992 | Serizawa et al. | 180/402 |
| 5,236,335 | A * | 8/1993 | Takeuchi et al. | 180/446 |
| 5,267,160 | A * | 11/1993 | Ito et al. | 701/42 |
| 5,448,481 | A * | 9/1995 | Asanuma et al. | 701/42 |
| 5,457,632 | A * | 10/1995 | Tagawa et al. | 701/43 |
| 5,587,899 | A * | 12/1996 | Ho et al. | 700/37 |
| 7,035,695 | B2 * | 4/2006 | Boiko | 700/28 |
| 2008/0164087 | A1 * | 7/2008 | Koyama et al. | 180/402 |
| 2009/0192679 | A1 * | 7/2009 | Kobayashi et al. | 701/42 |

FOREIGN PATENT DOCUMENTS

JP    62-145884    9/1987

(Continued)

*Primary Examiner*—Tuan C To
(74) *Attorney, Agent, or Firm*—Oblon, Spivak, McClelland, Maier & Neustadt, L.L.P.

(57) ABSTRACT

A target turning angle calculation part 51 calculates a target turning angle $\delta$ on the basis of a steering angle $\theta$ and a vehicle speed V. A correction turning angle calculation part 52 calculates a transfer function K(s) which is a second transfer function, depending on the vehicle speed V, by using a difference between a transfer function G(s) which is a first transfer function determined on the basis of the specification of the vehicle and a stationary component G(0) of the transfer function G(s), the first transfer function having as an input a turning angle $\delta$ and as an output a yaw rate $\gamma$ of the vehicle, the second transfer function having as an input a target turning rate $\delta^{*\prime}$ obtained by temporally differentiating the target turning angle $\delta^*$ and as an output a correction turning angle $\delta_c$. The correction turning angle calculation part 52 calculates a correction turning angle $\delta c$ by multiplying the transfer function K(s) by the target turning rate $\delta^{*\prime}$. A final target turning angle calculation part 53 inputs thereto the target turning angle $\delta^*$ from the target turning angle calculation part 51 and the correction turning angle $\delta c$ from the correction turning angle calculation part 52 and calculates a final target turning angle $\delta_d$ by adding the correction turning angle $\delta c$ to the target turning angle $\delta^*$.

10 Claims, 15 Drawing Sheets

FOREIGN PATENT DOCUMENTS

| | | |
|---|---|---|
| JP | 4-193684 | 7/1992 |
| JP | 2003-63429 | 3/2003 |
| JP | 2006-218888 | 8/2006 |
| JP | 2008-68661 | 3/2008 |
| JP | 2008-189200 | 8/2008 |

* cited by examiner

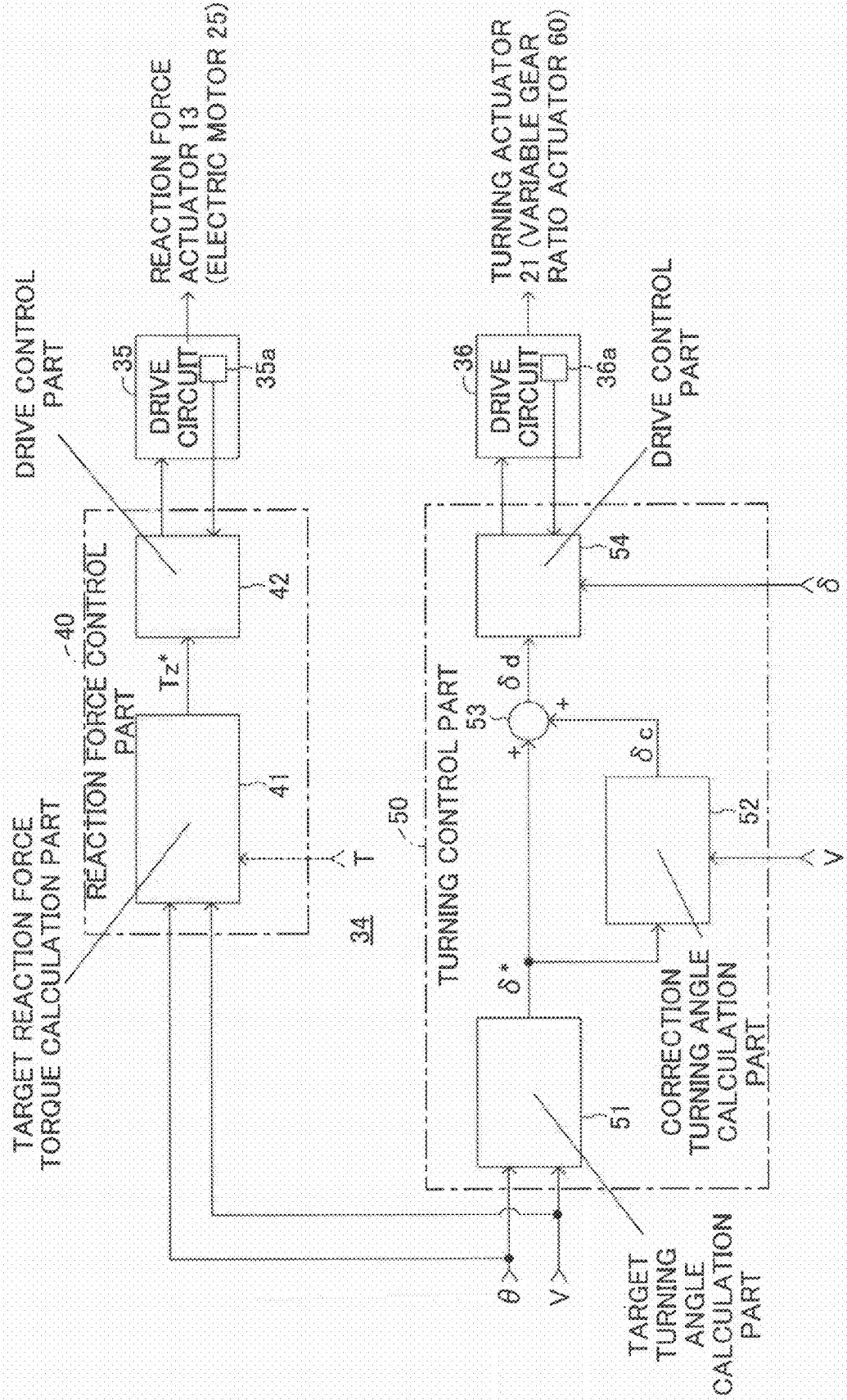

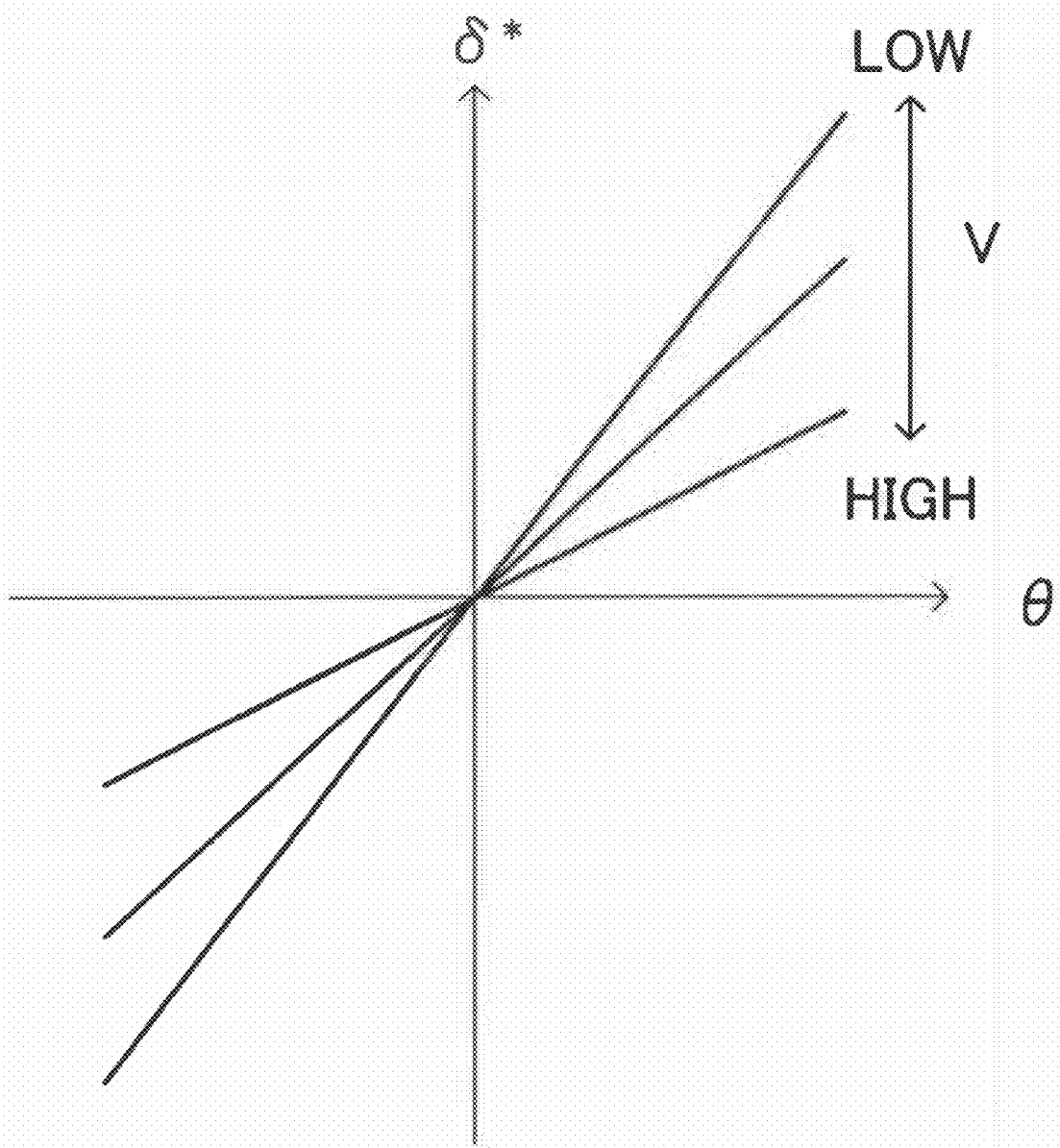

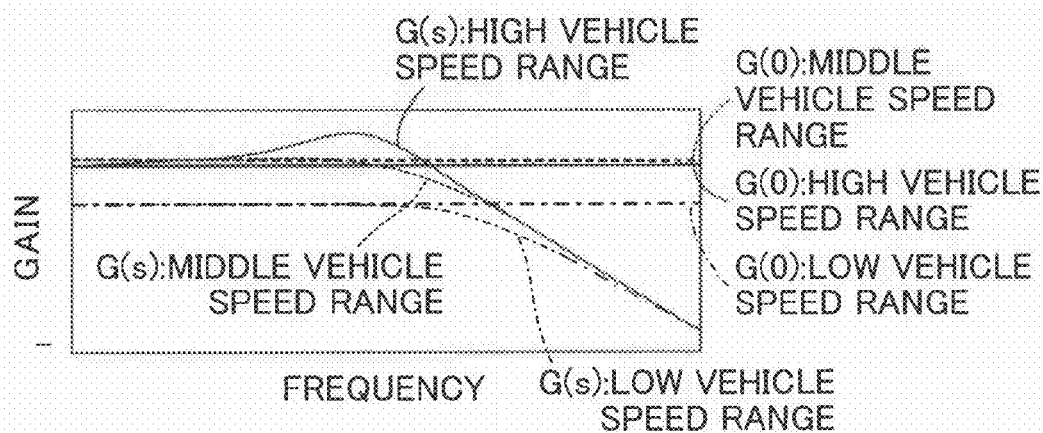

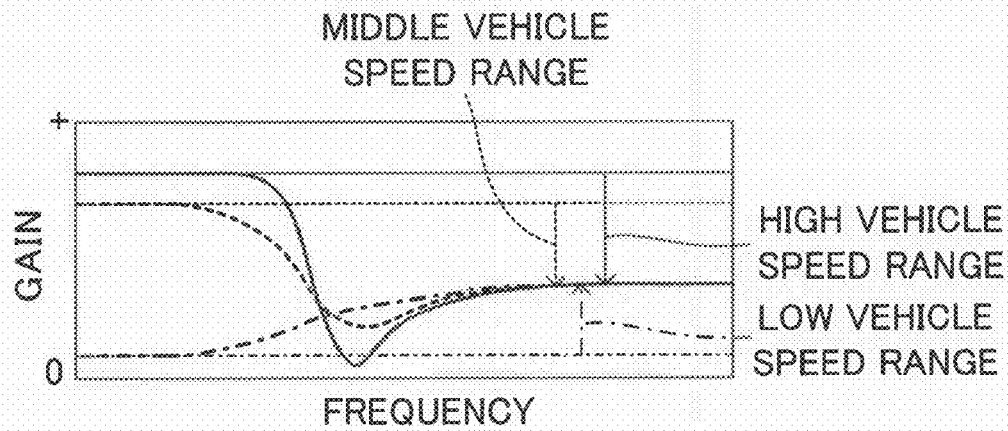
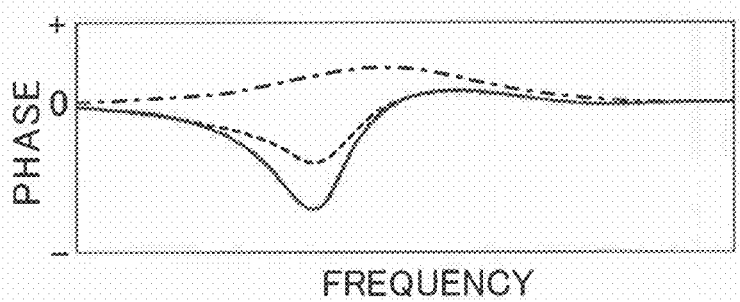

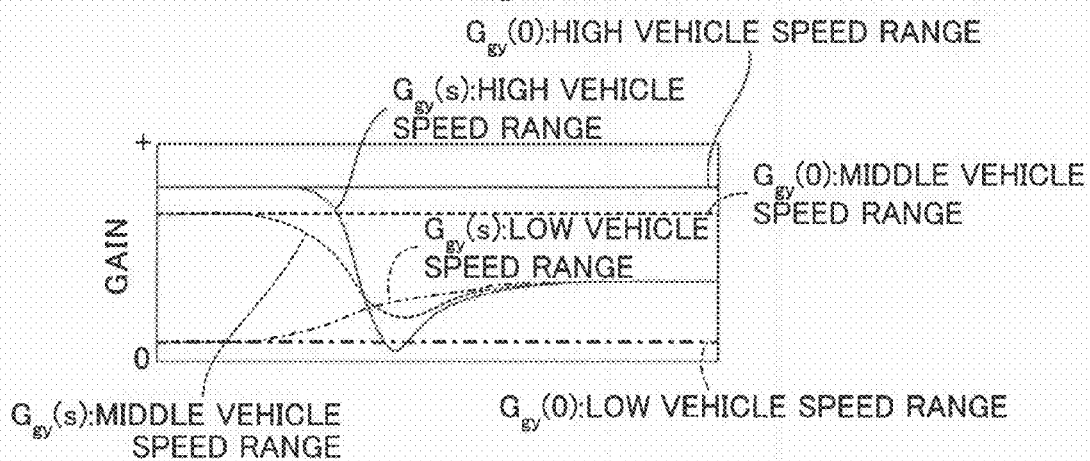

STEERING DEVICE OF VEHICLE

TECHNICAL FIELD

The present invention relates to a steering device of a vehicle, in particular, a steering device of a vehicle for turning wheels to be turned to a target turning amount, depending on an operation of a steering wheel by a driver.

BACKGROUND ART

Conventionally, a number of devices for improving a directional stability and responsiveness on the turning of the vehicle are proposed. For example, in the Japanese Unexamined Patent Publication No. 4-193684, a four-wheel steering device of a vehicle, which accomplishes an ideal transient responsiveness property on the steering of the front wheels, is disclosed. The prior four-wheel steering device of the vehicle comprises front-wheel turning angle control means for controlling the turning angles of the front wheels, depending on the running condition of the vehicle and rear-wheel turning angle control means for controlling the turning angles of the rear wheels, depending on the running condition of the vehicle. Further, in the prior four-wheel steering device of the vehicle, the front-wheel turning angle control means controls the turning angles of the front wheels to accomplish the front-wheel turning angles given by a control transfer function expressing a Laplace-transformed value of the front-wheel turning angle corresponding to the Laplace-transformed value of the front-wheel steering input, while the rear-wheel turning angle control means controls the turning angles of the rear wheels to accomplish the rear-wheel turning angles given by a control transfer function expressing the Laplace-transformed value of the rear-wheel turning angle corresponding to the Laplace-transformed value of the front-wheel steering input.

Further, for example, in the Japanese Unexamined Utility Model Publication No. 62-145884, an actual turning angle control device of a vehicle is disclosed. The prior actual turning angle control device of the vehicle comprises transmission property changing means for variably setting a transmission property set to determine a target value of a motion condition amount on the steering of the vehicle, depending on an input for adjusting the steering property of the vehicle. Then, in this prior actual turning angle control device of the vehicle, the target value of the motion condition amount of the vehicle is changed by variably setting the transmission property by the transmission property changing means by the driver, and the actual turning angles of the wheels can be controlled such that the target value can be accomplished and the steering property of the vehicle can be changed.

Furthermore, for example, in the Japanese Unexamined Patent Publication No. 2008-189200, a steering device of a vehicle for improving the responsiveness and the convergence of the behavior of the vehicle in response to the steering operation is disclosed. This prior steering device of the vehicle is adapted to set a target turning angle on the basis of the sum of the proportional term proportional to the steering angle and the differential term proportional to the steering angle rate. Further, in this prior steering device of the vehicle, in case that the steering angle is negative, the proportional term is corrected such that it becomes a small value, compared with the case that the steering angle is positive.

DISCLOSURE OF THE INVENTION

It is known that a frequency responsiveness property of a motion condition amount (for example, a yaw rate, a lateral acceleration, etc.) generated in the vehicle on the turning of the vehicle changes, depending on the speed of the vehicle. Further, the change of the frequency responsiveness property, depending on the vehicle speed influences the directional stability and the responsiveness on the turning of the vehicle.

In this regard, in the four-wheel steering device of the vehicle disclosed in the above-mentioned Japanese Unexamined Patent Publication No. 4-193684 and the actual turning angle control device of the vehicle disclosed in the above-mentioned Japanese Unexamined Utility Model Publication No. 62-145884, regarding the response to the motion condition amount, a lag (a first order lag) is simply generated. Further, in the steering device of the vehicle disclosed in the above-mentioned Japanese Unexamined Patent Publication No. 2008-189200, the differential term proportional to the steering angle rate is simply decreased on the returning of the steering wheel which the directional stability is likely to be reduced. Accordingly, for example, depending on the speed of the vehicle, due to the change of the frequency responsiveness property of the motion condition amount of the vehicle, the directional stability of the vehicle may be reduced or the driver may feel a large or small responsiveness, and therefore the driver may feel strangeness.

Accordingly, regarding the directional stability and the responsiveness on the turning of the vehicle, it is necessary to consider the frequency responsiveness property of the motion condition amount generated in the vehicle in order to avoid the driver's feeling of the strangeness.

The present invention solves the above-mentioned problem and the object thereof is to provide a steering device of a vehicle which can obtain the appropriate directional stability and the appropriate responsiveness on the turning of the vehicle in consideration of the frequency responsiveness property of the motion condition amount generated in the vehicle.

In order to accomplish the above-mentioned object, the feature of the present invention is that in a steering device of a vehicle having a steering wheel to be operated by a driver in order to steer the vehicle and turning means for turning wheels to be turned, depending on the operation of the steering wheel, the steering device comprises:

operation input value detection means for detecting an operation input value of the driver to the steering wheel;

target turning amount calculation means for calculating a target turning mount of the wheels to be turned by using the operation input value detected by the operation input value detection means, the target turning amount having a predetermined relationship with the operation input value to the steering wheel;

transfer function setting means for setting a second transfer function by using a first transfer function determined on the basis of the specification of the vehicle, the first transfer function having as an input a turning amount of the wheels to be turned and as an output a motion condition amount generated in the vehicle by the turning of the wheels to be turned, the second transfer function having as an input a target turning rate indicating a temporal change of the target turning amount calculated by the target turning amount calculation means and as an output a turning amount of the wheels to be turned which are turned at the target turning rate;

correction turning amount calculation means for calculating a correction turning amount by using the second transfer function set by the transfer function setting means and the target turning rate, the correction turning amount correcting the change of the motion condition amount generated in the vehicle when the wheels to be turned are turned by the target turning amount calculated by the target turning amount calculation means;

final target turning amount calculation means for calculating a final target turning amount by adding the correction turning amount calculated by the correction turning amount calculation means to the target turning amount calculated by the target turning amount calculation means; and turning control means for turning the wheels to be turned, depending on the final target turning amount calculated by the final target turning amount calculation means.

According to this invention, the transfer function setting means can set the second transfer function, which second transfer function having as an input the target turning rate and as an output the turning amount of the wheels to be turned which are turned at the target turning rate, by the first transfer function determined on the basis of the specification of the vehicle (a vehicle model), which first transfer function having as an input the turning amount of the wheels to be turned and as an output the motion condition amount generated in the vehicle. Further, the correction turning amount calculation means can calculate the correction turning amount by using the second transfer function set as explained above and the target turning rate (in particular, by multiplying the second transfer function by the target turning rate). Thereby, the correction turning amount is calculated in a reflection of (in consideration of) the change of the motion condition amount generated in the vehicle along with the turning of the wheels to be turned, that is, in a reflection of (in consideration of) the frequency responsiveness property. Further, the final target turning amount calculation means can calculate the final target turning amount by adding the correction turning amount to the target turning amount and the turning control means can turn the wheels to be turned by the final target turning amount.

Thereby, in the vehicle which turns by the turning of the wheels to be turned by the target turning amount suitably corrected by the correction turning amount, that is, by the final target turning amount, the influence to the directional stability and the responsiveness along with the change of the frequency responsiveness property of the motion condition amount generated in the vehicle can be decreased. Accordingly, the appropriate directional stability and the appropriate responsiveness on the turning of the vehicle can be obtained and the driver's feeling of the strangeness regarding the change of the motion condition amount generated in the vehicle can be largely restricted.

Further, in this case, it is preferred that the transfer function setting means sets a stationary component out of a frequency responsiveness property of the first transfer function as the target frequency responsiveness property and sets the second transfer function by using a difference between the set target frequency responsiveness property and a frequency responsiveness property of the first transfer function. Further, in this case, in particular, it is preferred that the frequency responsiveness property of the first transfer function is, for example, a responsiveness property of a gain of the motion condition amount generated in the vehicle in response to a change of a frequency of the turning amount of the wheels to be turned.

According to these inventions, the transfer function setting means can set the frequency responsiveness property of the first transfer function, in particular, can set the stationary component out of the responsiveness property of the gain of the motion condition amount generated in the vehicle relative to the change of the frequency of the turning amount of the wheels to be turned as the target frequency responsiveness property, and can set the second transfer function by using the difference between the set target frequency responsiveness property and the frequency responsiveness property of the first transfer function. Thereby, the second transfer function is set such that the nonstationary component of the first transfer function, that is, the component influencing the directional stability and the responsiveness of the vehicle is reflected, and therefore the correction turning amount calculated by using the second transfer function is calculated as an amount for effectively correcting the component influencing the directional stability and the responsiveness of the vehicle.

Thereby, the change of the frequency responsiveness property of the motion condition amount generated in the vehicle, in particular, the change of the responsiveness property of the gain of the motion condition amount generated in the vehicle can be largely restricted by correcting the target turning amount by the correction turning amount. That is, in this case, the frequency responsiveness property of the motion condition amount generated in the vehicle can be generally constant and the extremely appropriate directional stability and the extremely appropriate responsiveness can be ensured. Accordingly, the further appropriate directional stability and the further appropriate responsiveness can be obtained on the turning of the vehicle and the driver's feeling of the strangeness regarding the change of the motion condition amount generated in the vehicle can be largely restricted.

Further, in this case, it is preferred that vehicle speed detection means is provided for detecting a speed of the vehicle and the transfer function setting means sets the second transfer function by using the vehicle speed detected by the vehicle speed detection means.

According to this invention, the transfer function setting means can set the second transfer function in consideration of the frequency responsiveness property of the motion condition amount of the vehicle which changes, depending on the vehicle speed, and therefore the correction turning amount calculated by using the second transfer function is calculated as an amount for suitably correcting the directional stability and the responsiveness of the vehicle which changes, depending on the vehicle speed. Accordingly, the further appropriate directional stability and the further appropriate responsiveness on the turning of the vehicle can be obtained and the driver's feeling of the strangeness regarding the change of the motion condition amount generated in the vehicle can be further largely restricted.

Further, in this case, it is preferred that the motion condition amount generated in the vehicle is one of a yaw rate of the vehicle and a lateral acceleration of the vehicle, and in this case, it is preferred that vehicle speed detection means is provided for detecting a speed of the vehicle and the transfer function setting means determines the first transfer function by replacing the motion condition amount with one of the yaw rate of the vehicle and the lateral acceleration of the vehicle, depending on the vehicle speed detected by the vehicle speed detection means. Further, in this case, it is preferred that, for example, the transfer function setting means determines the lateral acceleration of the vehicle as the motion condition amount of the vehicle when the vehicle runs at a low vehicle speed range that the vehicle speed detected by the vehicle speed detection means is low, while the transfer function setting means determines the yaw rate of the vehicle as the motion condition amount of the vehicle when the vehicle runs at a high vehicle speed range that the vehicle speed detected by the vehicle speed detection means is high.

According to these inventions, the yaw rate or the lateral acceleration which the driver can easily feel on the turning of the vehicle can be used as the motion condition amount generated in the vehicle, and the transfer function setting means can set the second transfer function, which second transfer function having as an input the target turning rate and as an output the turning amount of the wheels to be turned which are turned at the target turning rate, by using the first transfer function determined on the basis of the specification of the vehicle (the vehicle model), which first transfer function having as an input the turning amount of the wheels to be turned and as an output the yaw rate or the lateral acceleration generated in the vehicle. Further, the correction turning amount calculation means can calculate the correction turning amount by using the set second transfer function. Accordingly, the change of the frequency responsiveness property of the yaw rate or the lateral acceleration can be reflected (considered), and therefore the further appropriate directional stability and the further appropriate responsiveness on the turning of the vehicle can be obtained and the strangeness occurring along with the change of the yaw rate or the lateral acceleration which the driver can easily feel can be largely restricted.

Further, the transfer function setting means can set the second transfer function by using the first transfer function which has as an output the lateral acceleration of the vehicle, depending on the vehicle speed, in particular, when the vehicle runs at the low vehicle speed range, while the transfer function setting means can set the second transfer function by using the first transfer function which has as an output the yaw rate of the vehicle, depending on the vehicle speed, in particular, when the vehicle runs at the high vehicle speed range. Thereby, the correction turning amount calculation means can calculate the correction turning amount reflected (considered) by the change of the frequency responsiveness property of the lateral acceleration or the yaw rate which the driver can easily feel, depending on the vehicle speed range. Accordingly, the further appropriate directional stability and the further appropriate responsiveness on the turning of the vehicle can be obtained, and the strangeness occurring along with the change of the yaw rate or the lateral acceleration which the drive can easily feel can be further suitably restricted.

Further, in this case, for example, it is preferred that a steering-by-wire system, which a mechanical connection between the steering wheel and the turning means is released, is employed as the steering device of the vehicle, and the turning control means controls the drive of an actuator for actuating the turning means to turn the wheels to be turned by the final target turning amount. Further, for example, it is preferred that a variable gear ratio system, which the steering wheel and the turning means are connected to each other by changing means for changing a ratio of the turning amount of the wheels to be turned relative to the operation input value to the steering wheel, is employed as the steering device of the vehicle, and the turning control means controls the actuation of the changing means to turn the wheels to be turned by the final target turning amount.

In this regard, in case that the above-mentioned systems are employed, it is preferred that vehicle speed detection means is provided for detecting a speed of the vehicle, and the target turning amount calculation means calculates a target turning amount to increase a ratio of the turning amount of the wheels to be turned relative to the operation input value detected by the operation input value detection means when the vehicle runs at a low vehicle speed range that the vehicle speed detected by the vehicle speed detection means is low, while the target turning amount calculation means calculates a target turning amount to decrease the ratio of the turning amount of the wheels to be turned relative to the above-mentioned detected operation input value when the vehicle runs at a high vehicle speed range that the vehicle speed detected by the vehicle speed detection means is high.

According to these inventions, the target turning amount calculation means can change the target turning amount of the wheels to be turned relative to the operation input value of the driver to the steering wheel, depending on the vehicle speed by employing the steering-by-wire system or the variable gear ratio system as the steering device of the vehicle. Thereby, for example, the operation load when the driver operates the steering wheel can be decreased by increasing the turning amount of the wheels to be turned on the running at the low vehicle speed range, while the appropriate stability of the straight-ahead drive of the vehicle can be ensured by decreasing the turning amount of the wheels to be turned on the running at the high vehicle speed range.

BRIEF DESCRIPTION OF THE DRAWINGS

FIG. 2 shows a block view indicating control processes performed by an electronic control unit shown in FIG. 1.

FIG. 3 shows a graph indicating the relationship between a steering angle and a target turning angle.

FIG. 8 shows a view for explaining a stationary component (a target frequency responsiveness property) of the frequency responsiveness property of the yaw rate generated in the vehicle relative to the change of the frequency of the turning angle in the first embodiment.

FIGS. 10A and 10B show graphs indicating frequency responsiveness properties of a lateral acceleration generated in the vehicle relative to the change of the frequency of the turning angle in the second embodiment of the invention, respectively.

FIG. 13 shows a view for explaining a stationary component (a target frequency responsiveness property) of the frequency responsiveness property of the lateral acceleration generated in the vehicle relative to the change of the frequency of the turning angle in the second embodiment of the invention.

BEST MODE FOR CARRYING OUT THE INVENTION a. First Embodiment

Figure 1:
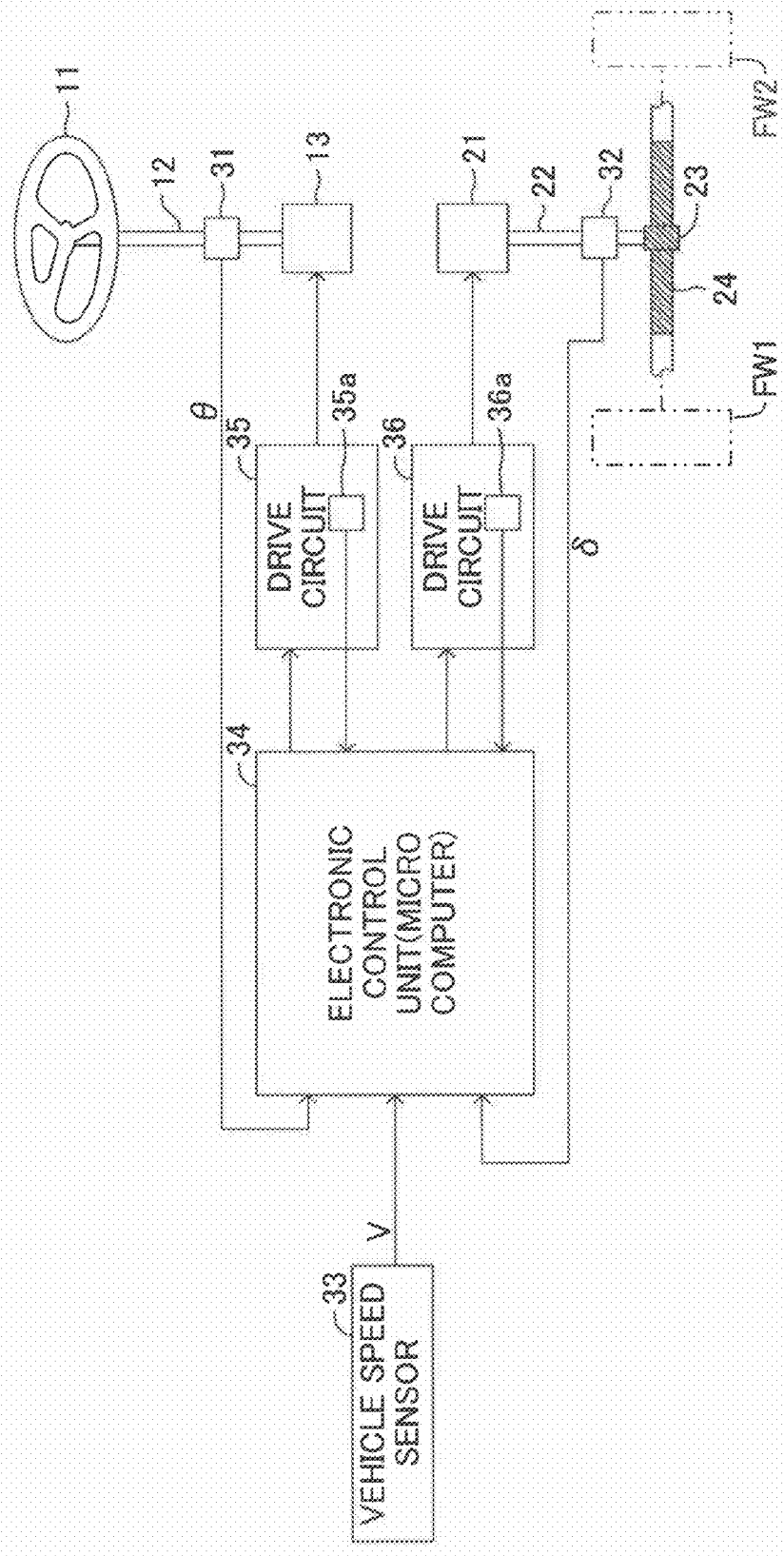
FIG. 1 shows a schematic view of a steering device of a vehicle common to first and second embodiments of the invention.

Below, steering devices of vehicles of the embodiments of the invention will be explained in detail by referring to the drawings. FIG. 1 schematically shows a steering device of a vehicle common to the first and second embodiments of the invention.

The steering device of the vehicle has a steering wheel 11 as an operation part which is rotated by the driver to turn right and left front wheels FW1 and FW2 which are wheels to be turned. The steering wheel 11 is secured to an upper end of a steering force input shaft 12, and a lower end of the steering force input shaft 12 is connected to a reaction force actuator 13 constituted by an electric motor and a reducer mechanism. The reaction force actuator 13 applies a reaction force to the rotation operation of the steering wheel 11 by the driver.

Further, the steering device of the vehicle has a turning actuator 21 constituted by an electric motor and a reducer mechanism. The turning force generated by the turning actuator 21 is transmitted to the right and left front wheels FW1 and FW2 via a turning force output shaft 22, a pinion gear 23 and a rack bar 24. According to this constitution, the rotation force generated by the turning actuator 21 is transmitted to the pinion gear 23 via the turning force output shaft 22 and the rack bar 24 is axially displaced by the rotation of the pinion gear 23, and therefore the right and left front wheels FW1 and FW2 are turned right and left by the axial displacement of the rack bar 24.

Next, an electronic control device for controlling the drive of the rotation of the reaction force actuator 13 and the drive of the rotation of the turning actuator 21 will be explained. The electronic control device has a steering angle sensor 31, a turning angle sensor 32 and a vehicle speed sensor 33.

The steering angle sensor 31 is assembled to the steering force input shaft 12 and detects a rotation angle of the steering wheel 11 relative to a neutral position of the steering wheel 11 to output a signal indicating a steering angle θ. The turning angle sensor 32 is assembled to the turning force output shaft 22 and detects the rotation angle of the turning force output shaft 22 relative to a neutral position of the turning force output shaft 22 to output a signal indicating an actual turning angle δ (corresponding to the turning angles of the right and left front wheels FW1 and FW2). It should be noted that the steering angle θ is "0" at the neutral position of the steering wheel and the actual turning angle δ is "0" at the neutral position of the turning force output shaft and, for example, the steering angle θ and the actual turning angle δ indicating rotation angles in the counterclockwise direction are indicated by positive values, respectively, while the steering angle θ and the actual turning angle δ indicating rotation angles in the clockwise direction are indicated by negative values, respectively. Further, in this specification, in case that the relationship in magnitude among the detected values without considering the directions thereof is explained, the absolute values of the detected values are referred. The vehicle speed sensor 33 detects the vehicle speed to output a signal indicating the vehicle speed V.

The sensors 31-33 are connected to an electronic control unit 34. The electronic control unit 34 has a microcomputer constituted by a CPU, a ROM, a RAM, etc. as main components and controls the actuation of the reaction actuator 13 and the turning actuator 21 by performing programs. Drive circuits 35 and 36 for driving the reaction force actuator 13 and the turning actuator 21, respectively, are connected to output parts of the electronic control unit 34, respectively. An electric current detector 35a for detecting drive electric current flowing in the electric motor in reaction actuator 13 is provided in the drive circuit 35 and an electric current detector 36a for detecting drive electric current flowing in the electric motor in the turning actuator 21 is provided in the drive circuit 36. The drive electric current detected by the electric current detector 35a is fed back to the electronic control unit 34 for controlling the drive of the respective electric motor and the drive electric current detected by the electric current detector 36a is fed back to the electronic control unit 34 for controlling the drive of the respective electric motor.

Next, the operation of the first embodiment constituted as explained above will be explained by using the function block view of FIG. 2 showing a function accomplished by the computer program processes in the electronic control unit 34. The electronic control unit 34 of the first embodiment has a reaction force control part 40 for controlling the application of the reaction force to the steering wheel 11 and a turning control part 50 for controlling the turning of the right and left front wheels FW1 and FW2. It should be noted that the operation of the reaction force control part 40 does not directly relate to the present invention, and therefore the operation will be briefly explained below.

When the steering wheel 11 is rotated by the driver, the steering angle θ, which is the rotation angle of the steering wheel 11, is detected by the steering angle sensor 31 and when the vehicle starts to run, the vehicle speed V is detected by the vehicle speed sensor 33 and then the signals indicating the detected steering angle θ and the detected vehicle speed V, respectively, are output to the reaction force control part 40 and the turning control part 50. In the reaction force part 40, a target reaction force torque calculation part 41 calculates a target reaction force torque Tz* on the basis of the input steering angle θ and the input vehicle speed V. It should be noted that when the target reaction force torque Tz* is calculated, for example, the target reaction force torque Tz* can be calculated by calculating a spring reaction force torque component proportional to the steering angle θ (or a lateral acceleration or a yaw rate generated in the vehicle) and friction and viscosity reaction force torque components proportional to the magnitude of a steering rate obtained by temporally differentiating the steering angle θ and summing up the torque components.

Further, it is preferred that the magnitude of the target reaction force torque Tz* is changed, depending on the vehicle speed V detected by the vehicle speed sensor 33, and for example, when the detected vehicle speed V is low, the target reaction force torque Tz* is calculated such that the magnitude thereof is small, and when the detected vehicle speed V is high, the target reaction force torque Tz* is calculated such that the magnitude thereof is large. Thereby, the driver can lightly rotate the steering wheel 11 at a low vehicle speed range, while the driver can rotate the steering wheel 11, feeling the sufficient reaction force torque at a high vehicle speed range, and therefore the appropriate steering operability can be ensured.

The target reaction force torque Tz* calculated as explained above is supplied to a drive control part 42. The drive control part 42 outputs a control signal (for example, a PWM control signal), which depends on the supplied target reaction force torque Tz*, to the drive circuit 35 to flow the drive electric current, which depends on the target reaction force torque Tz*, in the electric motor in the reaction force actuator 13 on the basis of the value detected by the electric current detector 35a. Thereby, the reaction force equal to the target reaction force torque Tz* is applied to the steering wheel 11 via the steering force input shaft 12. Accordingly, the suitable reaction force can be applied to the rotation operation of the steering wheel 11 by the driver and the driver can lightly rotate the steering wheel 11, feeling the reaction force.

On the other hand, in the turning control part 50, a target turning angle calculation part 51 calculates a target turning angle δ* on the basis of the steering angle θ input from the steering angle sensor 31 and the vehicle speed V input from the vehicle speed sensor 33 by referring to a map shown in FIG. 3. In this regard, the target turning angle δ* is a target value of the turning amount of turning of the right and left front wheels FW1 and FW2 in response to the rotation operation of the steering wheel 11 by the driver. Then, the target turning angle calculation part 51 supplies the calculated target turning angle δ* to a correction turning angle calculation part 52 and a final target turning angle calculation part 53.

It should be noted that there is generally a property of the vehicle such as a tendency that when the vehicle speed V becomes high, the large yaw and the large lateral acceleration of the vehicle relative to the turning angle δ of the right and left front wheels FW1 and FW2 are generated. Accordingly, as shown in FIG. 3, the target turning angle δ* calculated by the target turning angle calculation part 51 increases as the steering angle θ increases, while the target turning angle δ* has a change property that an amount of the change of the target turning angle δ* relative to the steering angle θ relatively decreases as the vehicle speed V increases.

In this embodiment, the target turning angle δ* is calculated by using the reference map. In this case, in place of the reference of the reference map, a function defining the target turning angle δ*, which changes, depending on the steering angle θ and the vehicle speed V, may be memorized and the target turning angle δ* may be calculated by using the function. Further, in this embodiment, the target turning angle δ*, which linearly changes relative to the steering angle θ, is calculated. In this case, for example, the target turning angle δ*, which nonlinearly changes relative to the steering angle θ, may be calculated.

Now, in the common vehicle, in case that the driver rotates the steering wheel 11 to turn the right and left front wheels FW1 and FW2 to turn the vehicle, there is a tendency that the change of the direction generated by the yawing motion of the vehicle is large (diverges) mainly at the high vehicle speed range that the vehicle speed V is high, and therefore the direction of the vehicle is likely to become unstable, while a lag of the change of the direction of the vehicle generated by the yawing motion of the vehicle occurs at the low vehicle speed range that the vehicle speed V is low, and therefore the feeling of the lightness is likely to be reduced. That is, such a tendency changes, depending on the vehicle speed V as schematically shown in FIGS. 4A and 4B, and derives from the transient responsiveness property of the yaw rate generated in the vehicle as a motion condition amount relative to the periodic change of the steering angle θ, in other words, the periodic change (the change of the frequency) of the actual turning angle δ which changes along with the change of the steering angle θ.

Figure 4A:
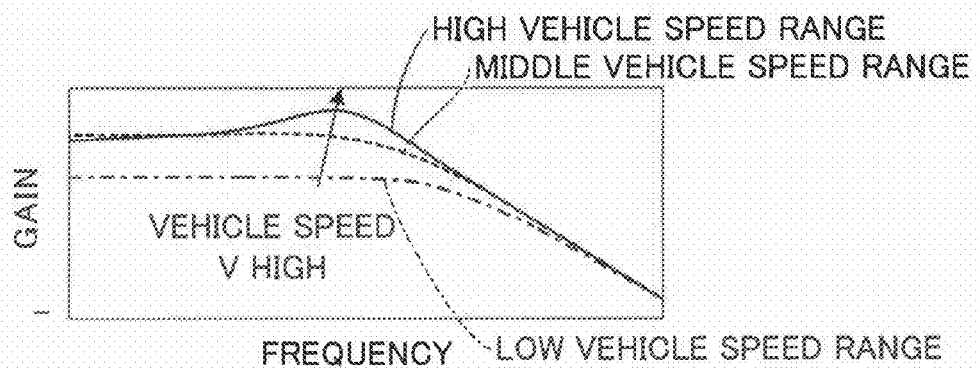
FIGS. 4A and 4B show graphs indicating frequency responsiveness properties of a yaw rate generated in the vehicle relative to a change of a frequency of the turning angle in the first embodiment of the invention, respectively.

As will be concretely explained, in the common vehicle, as shown in FIG. 4A, a gain (an amplitude ratio) of the yaw rate relative to the change of the frequency of the steering angle θ, that is, the change of the frequency of the actual turning angle δ has a tendency that the gain is generally constant when the frequency is small, and has a peak at the frequency corresponding to the natural frequency, that is, the resonance frequency of the vehicle when the frequency becomes large, and then decreases at the frequency larger than the resonance frequency. Further, the peak at the resonance frequency tends to increase as the vehicle speed V increases, in other words, the damping ratio tends to decrease as the vehicle speed V increases. According to the tendency, the directional stability of the vehicle decreases by the generation of the excess yaw mainly at the high vehicle speed range.

Figure 4B:
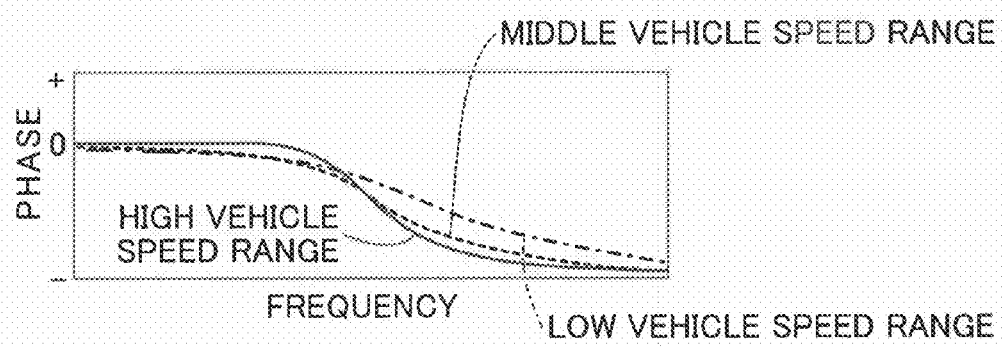

Further, in the common vehicle, as shown in FIG. 4B, a phase angle of a yaw rate relative to the change of the frequency of the steering angle θ, that is, the change of the frequency of the actual turning angle δ has a tendency that the phase angle is generally "0" when the frequency is small, and a lag of the phase increases as the frequency increases and the vehicle speed V increases. Further, as explained above, mainly at the low vehicle speed range, the gain of the yaw rate tends to relatively decrease and the lag of the phase tends to occur, and therefore the lag of the responsiveness becomes marked and then the feeling of the lightness is likely to be reduced.

Accordingly, in case that the right and left front wheels FW1 and FW2 are simply turned to the target turning angle δ* calculated on the basis of the steering angle θ and the vehicle speed V by the target turning angle calculation part 51 to turn the vehicle, the vehicle turns with the above-explained tendencies. Accordingly, it is necessary to correct the target turning angle δ* in consideration of the change of the transient responsiveness property of the yaw rate relative to the steering angle θ, that is, the turning angle δ which changes, depending on the vehicle speed V.

Accordingly, the correction turning angle calculation part 52 calculates a correction turning angle $\delta_c$ for correcting the target turning angle δ* in order to restrict the above-mentioned generation of the excess yaw, in particular, at the high vehicle speed range and improve the above-mentioned lag of the responsiveness at the low vehicle speed range. Below, the calculation of the correction turning angle $\delta_c$ performed by the correction turning angle calculation part 52 will be explained in detail.

Figure 5:
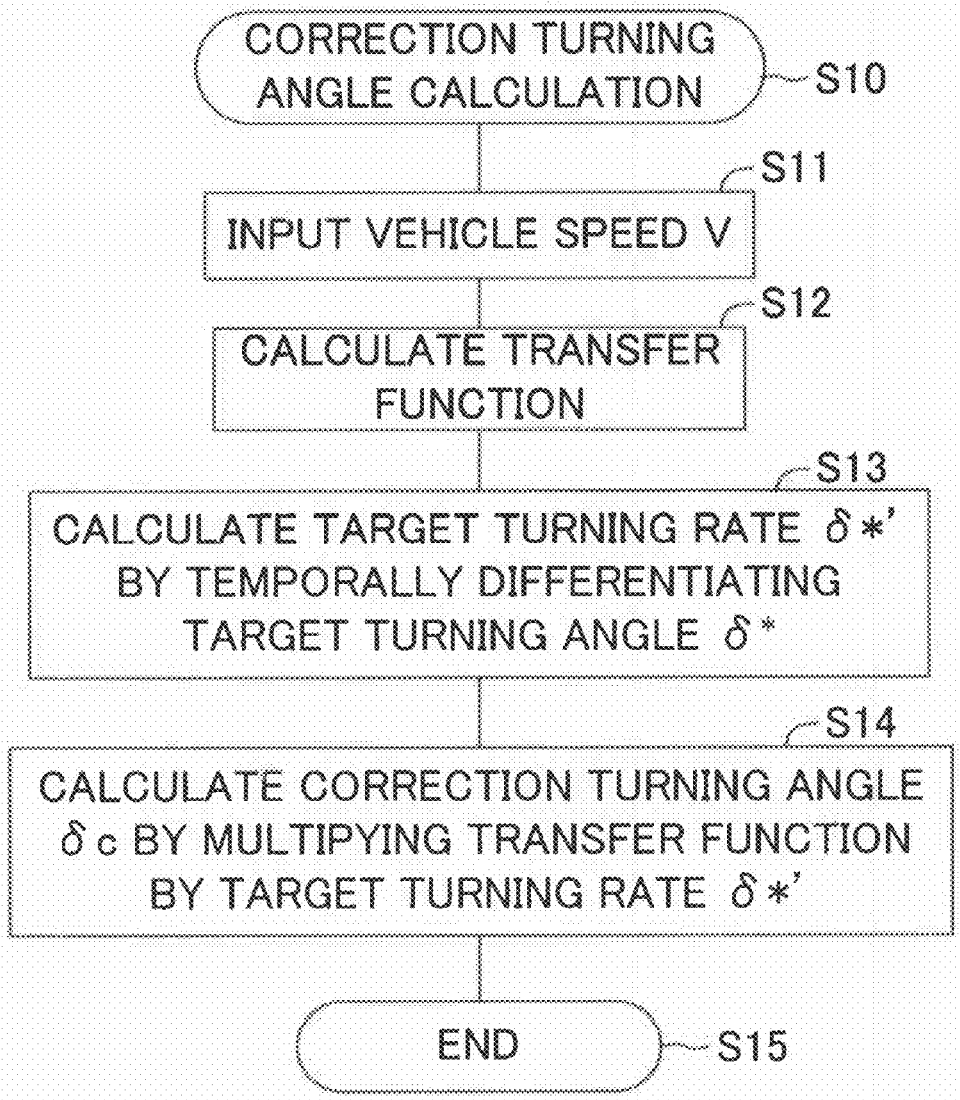
FIG. 5 shows a flow chart of a correction turning angle calculation program performed by a correction turning angle calculation part shown in FIG. 2 common to the first and second embodiments of the invention.

The correction turning angle calculation part 52 calculates the correction turning angle $\delta_c$ by performing the correction turning angle calculation program shown in FIG. 5. That is, the correction turning angle calculation part 52 starts to perform the correction turning angle calculation program at step S10 and inputs thereto the vehicle speed V detected by the vehicle speed sensor 33 at step S11. Then, the correction turning angle calculation part 52 calculates a transfer function K(s) for calculating the correction turning angle $\delta_c$ at step S12. Below, the transfer function K(s), which is a second transfer function, will be concretely explained.

When the vehicle starts to turn by the turning of the right and left front wheels FW1 and FW2 to the turning angle δ, the yaw rate γ is generated in the vehicle. Accordingly, assuming that the turning angle δ is an input and the yaw rate γ is an output, the transfer function G(s), which is a first transfer function, determined on the basis of the specification of the vehicle (the vehicle model) as explained below, is expressed by the following expression 1. It should be noted that in the following expression 1, indicates a Laplace operator.

$$\frac{\gamma}{\delta} = G(s) \qquad \text{Expression 1}$$

In this regard, the transfer function G(s) has a frequency responsiveness property shown in FIGS. 4A and 4B and indicates the transient responsiveness property of the yaw rate γ. Accordingly, the correction turning angle $\delta_c$ for restricting the above-mentioned generation of the excess yaw at the high vehicle speed range and improving the above-mentioned lag of the responsiveness at the low vehicle speed range can be expressed by the following expression 2 which uses the difference between the transfer function G(s) indicating the transient responsiveness property and the stationary component of the transfer function G(s), that is, the target frequency responsiveness property G(0).

$$\delta_c = \frac{1}{G(s)}\{G(0) - G(s)\}\delta^* \qquad \text{Expression 2}$$

It should be noted that in the expression 2, δ* indicates the target turning angle calculated by the target turning angle calculation part 51.

Generally, the motion equations of the vehicle in the two-wheel vehicle model can be expressed by the following expressions 3-5.

$$mV\frac{d\beta}{dt} + 2(K_f + K_r)\beta + \left\{mV + \frac{2}{V}(L_f K_f - L_r K_r)\right\}\gamma = 2K_f\delta \qquad \text{Expression 3}$$

$$2(L_f K_f - L_r K_r)\beta + I_z\frac{d\gamma}{dt} + \frac{2(L_f^2 K_f + L_r^2 K_r)}{V}\gamma = 2L_f K_f\delta \qquad \text{Expression 4}$$

$$a_{gy} = V\left(\frac{d\beta}{dt} + \gamma\right) \qquad \text{Expression 5}$$

In this regard, in the expression 3, m indicates an inertial mass of the vehicle. Further, in the expressions 3 and 4, $K_f$ and $K_r$ indicate front and rear cornering powers of the vehicle, respectively, $L_f$ indicates a distance between a gravity center of the vehicle and a wheel axle connecting the front wheels to each other, $L_r$ indicates a distance between the gravity center of the vehicle and a wheel axle connecting the rear wheels to each other, and δ indicates an actual turning angle of the right and left front wheels FW1 and FW2. Further, in the expression 4, Iz indicates a yawing moment of inertia of the vehicle. Further, in the expressions 3, 4 and 5, V indicates the vehicle speed, β indicates a sideship angle at the gravity center of the vehicle, and γ indicates the yaw rate of the vehicle. Further, in the expression 5, $a_{gy}$ indicates the lateral acceleration of the vehicle.

Then, the expressions 3, 4 and 5 are transformed by the Laplace transform and the transformed expressions are solved as the simultaneous equations, and further the solved transformed expressions are arranged in terms of the actual turning angle δ, and then the following expression 6 can be obtained by using the expression 1.

$$\gamma = \frac{-4K_f(K_f L_f - K_r L_r) + 2K_f L_f\{2(K_f + K_r) + mVs\}}{2(K_f L_f - K_r L_r)\left\{\frac{2(K_f L_f - K_r L_r)}{V} + mV\right\} - \left\{I_z s + \frac{2(K_f L_f^2 - K_r L_r^2)}{V}\right\}\{2(K_f + K_r) + mVs\}}\delta \qquad \text{Expression 6}$$

$$= G(s)\delta$$

It should be noted that as is obvious from the expression 6, the transfer function G(s) is determined on the basis of the inertial mass m, the front wheel cornering power $K_f$ of the vehicle, the rear wheel cornering power $K_r$ of the vehicle, the distance $L_f$ between the gravity center of the vehicle and the wheel axle connecting the front wheels to each other and the distance $L_r$ between the gravity center of the vehicle and the wheel axle connecting the rear wheels to each other, which are predetermined as the specification of the vehicle. Then, the expression 6 obtained as explained above is applied to the expression 2 and then, the expression 2 is arranged and therefore the correction turning angle $\delta_c$ can be expressed by the following expression 7.

$$\delta_c = \frac{1}{G(s)}\{G(0) - G(s)\}\delta^* = K(s)\delta^{*\prime} \qquad \text{Expression 7}$$

In this regard, in the expression 7, δ*' indicates the target turning rate which is a temporally differentiated value (=dδ*/dt) obtained by temporally differentiating the target turning angle δ*. Further, in the expression 7, the transfer function K(s), which is the second transfer function, is expressed by the following expression 8.

$$K(s) = \frac{I_z K_r(L_f + L_r)(2K_f + 2K_r + mVs) - \frac{m(K_f L_f - K_r L_r)\{2K_r L_r(L_f + L_r) - L_f mV^2\}}{\{2K_r(L_f + L_r) + L_f mVs\}}V}{[K_r L_r mV^2 + K_f\{2K_r(L_f + L_r)^2 - L_f mV^2\}]} \qquad \text{Expression 8}$$

Figure 6A:
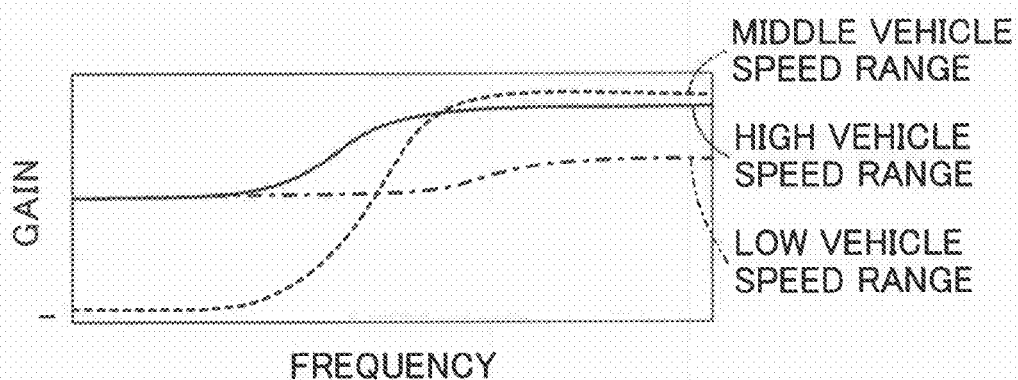
FIGS. 6A and 6B show graphs indicating frequency responsiveness properties of a transfer function which has as an input a target turning rate and as an output a target turning angle in the first embodiment of the invention, respectively.
Figure 6B:
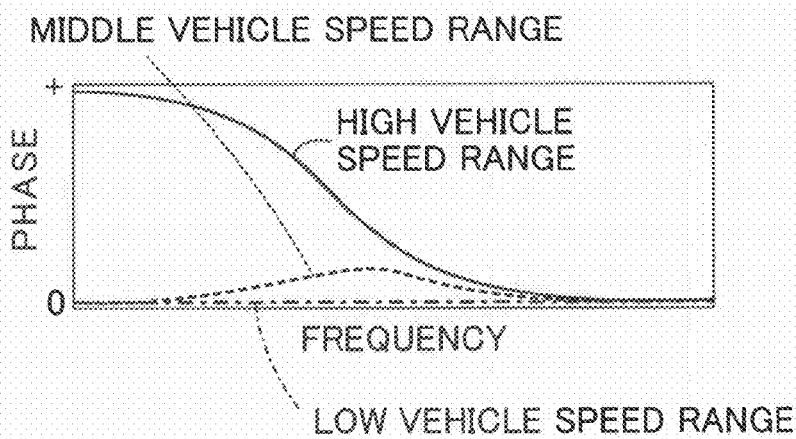
Figure 7:
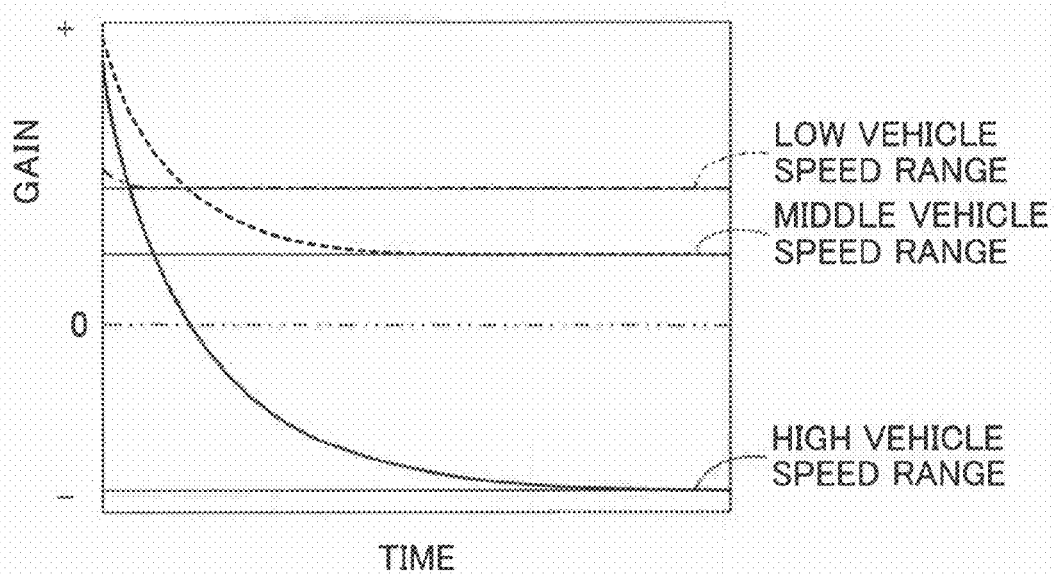
FIG. 7 shows a graph indicating a step responsiveness property of the transfer function which has as an input the target turning rate and as an output the target turning angle in the first embodiment of the invention.

In this regard, as is obvious from the expression 7, the transfer function K(s) expressed by the expression 8 is a transfer function which has as an input the target turning rate δ*' and as an output the correction turning angle $\delta_c$ (that is, the turning amount of the right and left front wheels FW1 and FW2 which turn at the target turning rate δ*'). Regarding the transfer function K(s), the frequency responsiveness property is shown in FIGS. 6A and 6B and the step responsiveness property is shown in FIG. 7. According to the transfer function K(s), as shown in FIG. 6A, the gain (the amplitude ratio) of the correction turning angle $\delta_c$ relative to the change of the frequency of the target turning rate δ*' has a change property which the gain increases as the frequency increases at the entire vehicle speed range (the low, middle and high vehicle speed ranges), in particular, a change property which the gain becomes maximum at the high frequency range. Thereby, the correction turning angle $\delta_c$ changes, having a high responsiveness, depending on the change of the frequency of the target turning rate δ*' of the right and left front wheels FW1 and FW2, in other words, the change of the frequency of the steering angle θ, in particular, the gain becomes large at the high frequency range, and therefore the above-mentioned decreasing of the gain of the yaw rate at the high frequency range can be improved.

Further, according to the transfer function K(s), as shown in FIG. 6B, the phase angle of the correction turning angle $\delta_c$ relative to the change of the frequency of the target turning rate $\delta^{*\prime}$ has a change property which advances the phase at the entire vehicle speed range. Thereby, the correction turning angle $\delta_c$ changes, having the high responsiveness, depending on the change of the frequency of the target turning rate $\delta^{*\prime}$ of the right and left front wheels FW1 and FW2, in other words, the change of the frequency of the steering angle θ, in particular, the phase is generally "0" at the low vehicle speed range, and therefore the correction turning angle $\delta_c$ can improve the above-mentioned lag of the responsiveness at the low vehicle speed range.

Further, according to the transfer function K(s), as shown in FIG. 7, the gain has the step responsiveness property which the gain is nonoscillatorily damped relative to the temporal change at the entire vehicle speed range. Then, according to this step responsiveness property, the gain for increasing the turning in the turning direction can be obtained at the low and middle vehicle speed ranges, while the gain for increasing the turning at the beginning of the turning and thereafter returning the turning can be obtained at the high vehicle speed range. That is, the gain for returning the turning as time advances can be obtained, in particular, at the high vehicle speed range, and therefore as shown in FIG. 4A, the increasing of the gain of the yaw rate at the resonance frequency can be restricted and the generation of the excess yaw can be restricted.

Then, the correction turning angle calculation part 52 determines the transfer function K(s) having the above-explained property by using the vehicle speed V detected by the vehicle speed sensor 33 in accordance with the expression 8. Next, at step S13, the correction turning angle calculation part 52 calculates the target turning rate $\delta^{*\prime}$ by temporally differentiating the target turning angle $\delta^*$ calculated by the target turning angle calculation part 51.

Next, at step S14, the correction turning angle calculation part 52 calculates the correction turning angle $\delta_c$ by multiplying the transfer function K(s) determined at the step S12 by the target turning rate $\delta^{*\prime}$ calculated at the step S13 in accordance with the expression 7. Then, when the correction turning angle calculation part 52 has calculated the correction turning angle $\delta_c$, the correction turning angle calculation part 52 terminates the performance of the correction turning angle calculation program at step S15 and after a predetermined short time has elapsed, the correction turning angle calculation part 52 starts to perform the program at step S10.

Again, referring to FIG. 2, when the correction turning angle calculation part 52 has calculated the correction turning angle $\delta_c$, the correction turning angle calculation part 52 supplies the correction turning angle $\delta_c$ to the final target turning angle calculation part 53. In the final target turning angle calculation part 53, the target turning angle $\delta^*$ calculated by the target turning angle calculation part 51 is input thereto and the correction turning angle $\delta_c$ calculated by the correction turning angle calculation part 52 is input thereto and then the final target turning angle $\delta_d$ is calculated by summing up the target turning angle $\delta^*$ and the correction turning angle $\delta_c$. Then, the final target turning angle calculation part 53 supplies the calculated final target turning angle $\delta_d$ to a drive control part 54.

In the drive control part 54, the supplied final target turning angle δ d is input thereto and the actual turning angle δ is input thereto from the turning angle sensor 32 and then the difference Δδ ($=\delta_d-\delta$) between the final target turning angle $\delta_d$ and the actual turning angle δ is calculated. Then, the drive control part 54 calculates a target electric current i* proportional to the difference Δδ, and inputs thereto the target electric current i* and the actual electric current i detected by the electric current detector 36a, which electric current i flows in the electric motor in the turning actuator 21, and then calculates the difference Δi ($=i^*-i$) therebetween.

Further, the drive control part 54 calculates a target voltage v* for driving the electric motor in the turning actuator 21 such that the difference Δi becomes zero by adding the proportional term proportional to the calculated difference Δi to the integral term obtained by integrating the differences Δi. Then, the drive control part 54 outputs a PWM control voltage signal corresponding to the target voltage v* to the drive circuit 36. The drive circuit 36 switches a switching element on and off at a duty ratio corresponding to the PWM control voltage signal to apply the target voltage v* to the electric motor in the turning actuator 21. Thereby, the right and left front wheels FW1 and FW2 are turned to the final target turning angle $\delta_d$ by the drive force of the electric motor in the turning actuator 21.

Now, the yaw rate γ generated in the vehicle which turns by the turning of the right and left front wheels FW1 and FW2 to the final target turning angle $\delta_d$ will be explained. In the above-mentioned expression 1, the final target turning angle $\delta_d$, that is, $\delta^*+\delta_c$ is substituted into the turning angle δ and the expression 1 is arranged by using the above-mentioned expression 2 in terms of the target turning angle $\delta^*$ and then the yaw rate γ can be expressed by the following expression 9.

$$\begin{aligned}\gamma &= G(s)(\delta^* + \delta_c) \\ &= G(s)\left[1 + \frac{1}{G(s)}\{G(0) - G(s)\}\right]\delta^* \\ &= G(s)\frac{G(0)}{G(s)}\delta^* \\ &= G(0)\delta^*\end{aligned} \qquad \text{Expression 9}$$

According to the expression 9, the yaw rate γ generated in the turning vehicle, which the correction turning angle $\delta_c$ is applied, is a rate obtained by multiplying the stationary component G(0) of the transfer function G(s) by the target turning angle $\delta^*$. In other words, as shown in FIG. 8 corresponding to FIG. 4A, the yaw rate γ has a property that the target frequency responsiveness property G(0) is applied to the target turning angle $\delta^*$ by employing the stationary component G(0) of the transfer function G(s) having the frequency responsiveness properties which are different from each other, depending on the low, middle and high vehicle speed ranges as the target frequency responsiveness property.

Figure 9A:
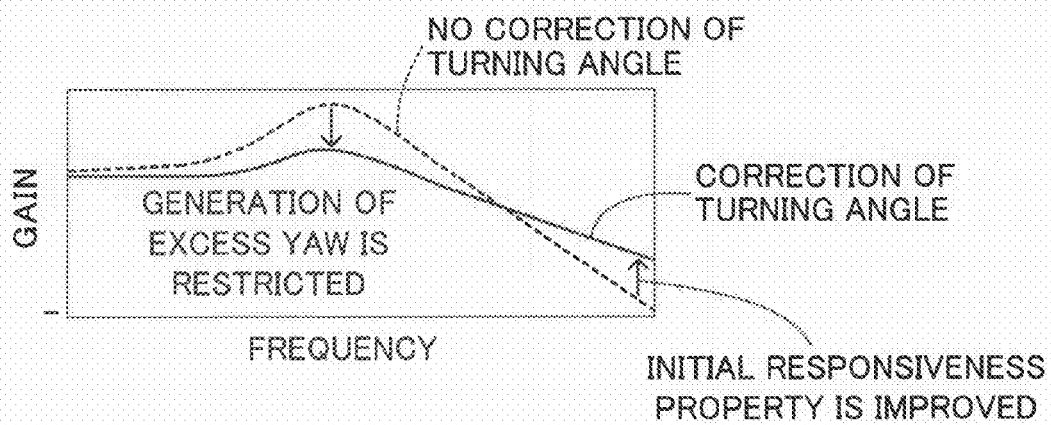
FIGS. 9A and 9B show views, respectively, for explaining the change of the frequency responsiveness property of the yaw rate generated in the vehicle in case that the target turning angle is corrected by a correction turning angle.
Figure 9B:
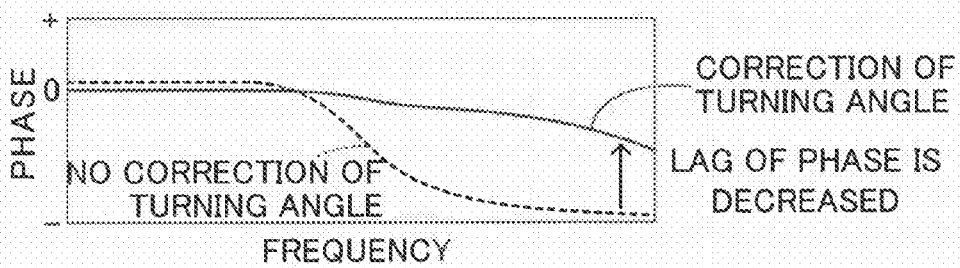

As explained above, in case that the target frequency responsiveness property G(0) is applied, as is obvious from FIG. 8, the change of the gain of the yaw rate γ relative to the change of the frequency of the actual turning angle δ of the right and left front wheels FW1 and FW2 is restricted and the change property of the gain tends to be constant even when the vehicle speed V changes. Thereby, as shown by the solid line of FIG. 9A corresponding to FIG. 4A, in case that the target turning angle $\delta^*$ is corrected by applying the correction turning angle $\delta_c$ thereto, compared with the case that the target turning angle $\delta^*$ is not corrected as shown by the chain line, the generation of the excess yaw at the resonance frequency can be restricted and the decreasing of the gain at the high frequency range can be restricted, and therefore the initial responsiveness property can be improved. Further, as shown by the solid line of FIG. 9B corresponding to FIG. 4B, in case that the target turning angle $\delta^*$ is corrected by applying the correction turning angle $\delta_c$ thereto, compared with the case that the target turning angle $\delta^*$ is not corrected as shown by the chain line, the lag of the phase at the high frequency range can be restricted and the lag of the responsiveness can be improved.

As can be understood from the above explanation, according to the first embodiment, the correction turning angle calculation part 52 uses the transfer function G(s) which is the first transfer function and can set the frequency responsiveness property of the transfer function G(s), in particular, set the stationary component G(0) out of the responsiveness property of the gain of the yaw rate γ generated in the vehicle relative to the change of the frequency of the actual turning angle δ as the target frequency responsiveness property, and can set a transfer function K(s), which is the second transfer function, by using the difference between the set target frequency responsiveness property G(0) and the transfer function G(s). Thereby, the transfer function K(s) is set in a reflection of the nonstationary component of the transfer function G(s), that is, the component which influences the directional stability and the responsiveness of the vehicle, and therefore the correction turning angle $\delta_c$ calculated by using this transfer function K(s) is calculated as a function for effectively correcting the component which influences the directional stability and the responsiveness of the vehicle.

Thereby, the change of the frequency responsiveness property of the yaw rate γ generated in the vehicle, in particular, the change of the responsiveness property of the gain of the yaw rate γ can be largely restricted by correcting the target turning amount $\delta^*$ by the correction turning angle $\delta_c$. That is, in this case, the frequency responsiveness property of the yaw rate γ generated in the vehicle can be generally constant, and therefore the extremely appropriate directional stability and the extremely appropriate responsiveness can be ensured. Accordingly, the further appropriate directional stability and the further appropriate responsiveness on the turning of the vehicle can be obtained and regarding the change of the yaw rate γ generated in the vehicle, the strangeness felt by the driver can be further largely restricted.

Further, the correction turning angle calculation part 52 can set the transfer function K(s) in consideration of the frequency responsiveness property of the yaw rate γ of the vehicle which changes, depending on the vehicle speed V, and therefore the correction turning angle $\delta_c$ calculated by using the transfer function K(s) is calculated as an angle for restricting the generation of the excess yaw at the high vehicle speed range to ensure the directional stability of the vehicle and appropriately correcting the responsiveness at the low vehicle speed range. Accordingly, the further appropriate directional stability and the further appropriate responsiveness can be obtained, depending on the vehicle speed V.

b. Second Embodiment

In the above-explained first embodiment, the correction turning angle calculation part 52 determines the transfer function K(s), which has as an input the target turning rate $\delta^{*\prime}$ and as an output the correction turning angle $\delta_c$, by using the difference between the transfer function G(s) indicating the transient responsiveness property, which transfer function has as an input the turning angle δ and as an output the yaw rate γ, and the stationary component G(0) of the transfer function G(s). Further, the correction turning angle $\delta_c$, which depends on the target turning rate $\delta^{*\prime}$, is calculated by using the transfer function K(s). Thereby, the change of the frequency responsiveness property of the yaw rate γ can be restricted, the directional stability of the vehicle at the high vehicle speed range can be ensured and the lag of the responsiveness at the low vehicle speed range can be improved.

In this regard, in the common vehicle, as shown in FIG. 10A, a gain (an amplitude ratio) of the lateral acceleration relative to the change of the frequency of the steering angle θ, that is, the actual turning angle δ is generally constant when the frequency is small, and the gain has a tendency that it decreases at the middle and high vehicle speed ranges as the frequency increases, while the gain has a tendency that it increases at the low vehicle speed range as the frequency increases. Further, in the common vehicle, as shown in FIG. 10B, the phase angle of the lateral acceleration relative to the change of the frequency of the steering angle θ, that is, the actual turning angle δ has a tendency that the lag of the phase increases and thereafter becomes generally "0" at the middle and high vehicle speed ranges as the frequency increases, while the advancing of the phase increases and thereafter becomes generally "0" at the low vehicle speed range as the frequency increases.

Because of such a frequency responsiveness property, mainly, at the low vehicle speed range, the vehicle tends to run along a track inside a track which the driver intends by the increasing of the gain and the advancing of the phase at the high frequency range, and the driver feels strangeness that the vehicle runs largely inwards along with the rotation operation of the steering wheel 11. Further, mainly, at the high vehicle speed range, the lag of the phase tends to increase as the gain largely decreases, and therefore the driver feels strangeness that the generation of the lateral acceleration is delayed along with the rotation operation of the steering wheel 11.

Accordingly, in the second embodiment, in consideration of the change of the transient responsiveness property of the lateral acceleration relative to the steering angle θ, that is, the turning angle δ which changes, depending on the vehicle speed V, the correction turning angle $\delta_c$ for correcting the target turning angle $\delta^*$ is calculated. It should be noted that the second embodiment will be explained in detail below, however, the same parts as those of the first embodiment are indicated by the same reference symbols as those of the first embodiment and the explanations thereof will be omitted.

In the second embodiment, similar to the first embodiment, the correction turning angle calculation part 52 performs the correction turning angle calculation program shown in FIG. 5. In this regard, the process of the step S12 of the correction turning angle calculation program is different from that of the first embodiment. That is, as explained above, in the second embodiment, the correction turning angle $\delta_c$ is calculated in consideration of the change of the transient responsiveness property of the lateral acceleration. Accordingly, the correction turning angle calculation part 52 calculates the transfer function $K_{gy}(s)$ for calculating the correction turning angle $\delta_c$ in place of the transfer function K(s) of the first embodiment. Below, the transfer function $K_{gy}(s)$, which is the second transfer function, will be concretely explained.

When the vehicle starts to turn by the turning of the right and left front wheels FW1 and FW2 to the turning angle δ, the lateral acceleration $a_{gy}$ is generated in the vehicle. Accordingly, when the turning angle δ is an input and the lateral acceleration $a_{gy}$ is an output, as explained later, the transfer function $G_{gy}(s)$, which is the first transfer function determined on the basis of the specification of the vehicle, is expressed by the following expression 10. It should be noted that in the following expression 10, s indicates a Laplace operator.

$$\frac{a_{gy}}{\delta} = G_{gy}(s) \qquad \text{Expression 10}$$

In this regard, the transfer function $G_{gy}(s)$ has a frequency responsiveness property shown in FIGS. 10A and 10B and indicates the transient responsiveness property of the lateral acceleration $a_{gy}$. Accordingly, the correction turning angle $\delta_c$ for restricting the strangeness such as the above-mentioned inward running at the low vehicle speed range and improving the lag of the generation of the lateral acceleration $a_{gy}$ at the high vehicle speed range can be expressed by the following expression 11 which uses the difference between the transfer function $G_{gy}(s)$ indicating the transient responsiveness property and the stationary component of the transfer function $G_{gy}(s)$, that is, the target frequency responsiveness property $G_{gy}(0)$.

$$\delta_c = \frac{1}{G_{gy}(s)}\{G_{gy}(0) - G_{gy}(s)\}\delta^* \qquad \text{Expression 11}$$

It should be noted that in the expression 11, $\delta^*$ indicates the target turning angle calculated by the target turning angle calculation part 51.

In this regard, generally, the motion equations of the vehicle in the two-wheel vehicle model can be expressed by the above-mentioned expressions 3-5. Then, the expressions 3, 4 and 5 are transformed by the Laplace transform and the transformed expressions are solved as the simultaneous equations, and further the solved transformed expressions are arranged in terms of the actual turning angle $\delta$, and then the following expression 12 can be obtained by using the expression 10.

$$a_{gy} = \frac{2K_f V\{I_z V s^2 + 2K_r(L_f + L_r)(L_r s + V)\}}{2K_f[2K_r(L_f + L_r)^2 + \{I_z s + L_f m(L_f s - V)\}V] + V\{2K_r L_r m(L_r s + V) + I_z s(2K_r + mVs)\}} \delta \qquad \text{Expression 12}$$

$$= G_{gy}(s)\delta$$

It should be noted that as is obvious from the expression 12, the transfer function $G_{gy}(s)$ is also determined on the basis of the inertial mass m, the front wheel cornering power $K_f$ of the vehicle, the rear wheel cornering power $K_r$ of the vehicle, the distance $L_f$ between the gravity center of the vehicle and the wheel axle connecting the front wheels to each other and the distance $L_r$ between the gravity center of the vehicle and the wheel axle connecting the rear wheels to each other, which are predetermined as the specification of the vehicle. Then, the expression 12 obtained as explained above is applied to the expression 11 and the expression 12 is arranged and therefore the correction turning angle $\delta_c$ can be expressed by the following expression 13.

$$\delta_c = \frac{1}{G_{gy}(s)}\{G_{gy}(0) - G_{gy}(s)\}\delta^* = K_{gy}(s)\delta^{*\prime} \qquad \text{Expression 13}$$

In this regard, in the expression 13, $\delta^{*\prime}$ indicates the target turning rate which is a temporally differentiated value ($=d\delta^*/dt$) obtained by temporally differentiating the target turning angle $\delta^*$. Further, in the expression 13, the transfer function $K_{gy}(s)$, which is the second transfer function, is expressed by the following expression 14.

$$K_{gy}(s) = \frac{I_z K_r V^2 \{2K_r(L_f + L_r) + L_f mVs\}}{\{I_z V s^2 + 2K_r(L_f L_r)(L_r s + V)\}} + \qquad \text{Expression 14}$$
$$[K_r L_r mV^2 + K_f\{2K_r(L_f + L_r)^2 - L_f mV^2\}]$$

$$\frac{K_f \begin{bmatrix} -4K_r^2(L_r + L_r)^3 + I_z L_f mV^3 s + 2K_r(L_f + L_r) \\ V\{L_f(L_f + L_r)mV + I_z(-L_f s - L_r s + V)\} \end{bmatrix}}{\{I_z V s^2 + 2K_r(L_f L_r)(L_r s + V)\}}$$
$$[K_r L_r mV^2 + K_f\{2K_r(L_f + L_r)^2 - L_f mV^2\}]$$

Figure 11A:
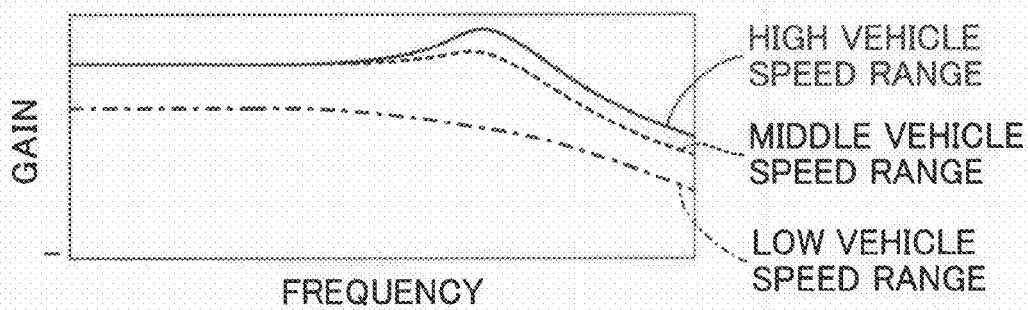
FIGS. 11A and 11B show graphs indicating frequency responsiveness properties of a transfer function which has as an input the target turning rate and as an output the target turning angle in the second embodiment of the invention, respectively.
Figure 11B:
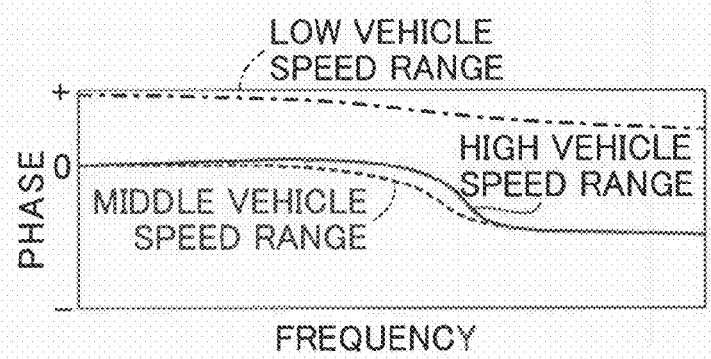
Figure 12:
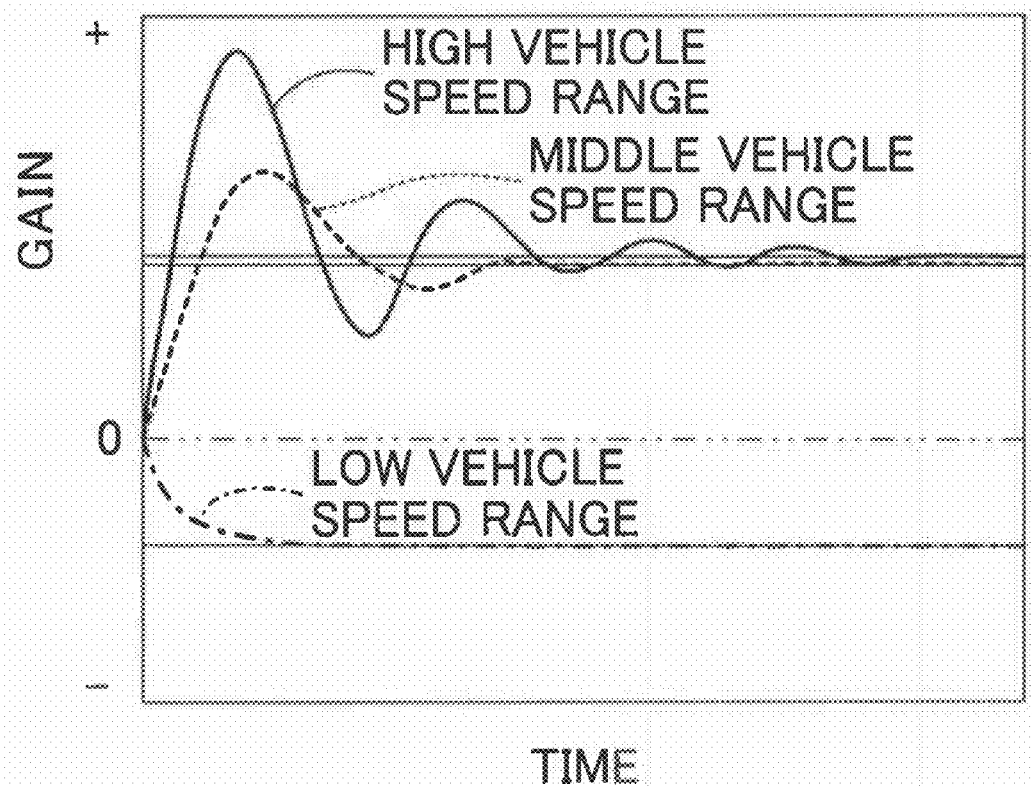
FIG. 12 shows a graph indicating a step responsiveness property of the transfer function which has as an input the target turning rate and as an output the target turning angle in the second embodiment of the invention.

In this regard, as is obvious from the expression 13, the transfer function $K_{gy}(s)$ expressed by the expression 14 is a transfer function which has as an input the target turning rate $\delta^{*\prime}$ and as an output the correction turning angle $\delta_c$ (that is, the turning amount of the right and left front wheels FW1 and FW2 which turn at the target turning rate $\delta^{*\prime}$). Regarding the transfer function $K_{gy}(s)$, the frequency responsiveness property is shown in FIGS. 11A and 11B and the step responsiveness property is shown in FIG. 12. According to the transfer function $K_{gy}(s)$, as shown in FIG. 11A, a gain (an amplitude ratio) of the correction turning angle $\delta_c$ relative to the change of the frequency of the target turning rate $\delta^{*\prime}$ has a change property which the gain generally decreases as the frequency increases at the entire vehicle speed range, in particular, a change property which the gain constantly decreases as the frequency increases at the low vehicle speed range. Thereby, the correction turning angle $\delta_c$ can improve the strangeness such as the above-mentioned inward running by the decreasing of the gain when the frequency of the target turning rate $\delta^{*\prime}$ of the right and left front wheels FW1 and FW2, in other words, the frequency of the steering angle $\theta$ is within a high frequency range.

Further, according to the transfer function $K_{gy}(s)$, as shown in FIG. 11B, the phase angle of the correction turning angle $\delta_c$ relative to the change of the frequency of the target turning rate $\delta^{*\prime}$ has a change property which the lag along with the increasing of the frequency is small at the middle and high vehicle speed ranges. Thereby, the correction turning angle $\delta_c$ changes, having a high responsiveness, depending on the change of the frequency of the target turning rate $\delta^{*\prime}$ of the right and left front wheels FW1 and FW2, in other words, the change of the frequency of the steering angle $\theta$, in particular, the lag of the phase is small at the middle and high vehicle speed ranges, and therefore the above-mentioned lag of the generation of the lateral acceleration $a_{gy}$ at the high vehicle speed range can be improved.

Further, according to the transfer function $K_{gy}(s)$, as shown in FIG. 12, the gain has a step responsiveness property which the gain is oscillatorily damped relative to the temporal change at the middle and high vehicle speed ranges and the gain is nonoscillatorily damped relative to the temporal change at the low vehicle speed range. Then, according to this step responsiveness property, the gain for increasing the turning in the turning direction in order to further improve the responsiveness can be obtained at the middle and high vehicle speed ranges, while the gain for returning the turning can be obtained at the low vehicle speed range. That is, the gain for returning the turning as time advances can be obtained at the low vehicle speed range, and therefore as shown in FIG. 10A, the increasing of the gain of the lateral acceleration can be restricted and the strangeness such as the inward running can be improved.

Then, similar to the first embodiment, the correction turning angle calculation part 52 determines the transfer function $K_{gy}(s)$ having the above-explained property by using the vehicle speed V detected by the vehicle speed sensor 33 in accordance with the expression 14. Next, similar to the first embodiment, the correction turning angle calculation part 52 performs the step S13 and the steps following it.

Similar to the first embodiment, the lateral acceleration $a_{gy}$ generated in the vehicle which turns by the turning of the right and left front wheels FW1 and FW2 to the final target turning angle $\delta_d$ will be explained. In the above-explained expression 10, the final target turning angle $\delta_d$, that is, $\delta^*+\delta_c$ is substituted into the turning angle $\delta$ and the expression 10 is arranged by using the above-explained expression 11 in terms of the target turning angle $\delta^*$ and then the lateral acceleration $a_{gy}$ can be expressed by the following expression 15.

$$\begin{aligned} a_{gy} &= G_{gy}(s)(\delta^* + \delta_c) \\ &= G_{gy}(s)\left[1 + \frac{1}{G_{gy}(s)}\{G_{gy}(0) - G_{gy}(s)\}\right]\delta^* \\ &= G_{gy}(s)\frac{G_{gy}(0)}{G_{gy}(s)}\delta^* \\ &= G_{gy}(0)\delta^* \end{aligned} \quad \text{Expression 15}$$

According to the expression 15, the lateral acceleration $a_{gy}$ generated in the vehicle which turns by the application of the correction turning angle $\delta_c$ is a lateral acceleration obtained by multiplying the stationary component $G_{gy}(0)$ of the transfer function $G_{gy}(s)$ by the target turning angle $\delta^*$. In other words, as shown in FIG. 13 corresponding to FIG. 10A, the lateral acceleration $a_{gy}$ has a property that the target frequency responsiveness property $G_{gy}(0)$ is applied to the target turning angle $\delta^*$ by employing the stationary component $G_{gy}(0)$ of the transfer function $G_{gy}(s)$ having the frequency responsiveness properties which are different from each other, depending on the low, middle and high vehicle speed ranges as the target frequency responsiveness property.

Figure 14A:
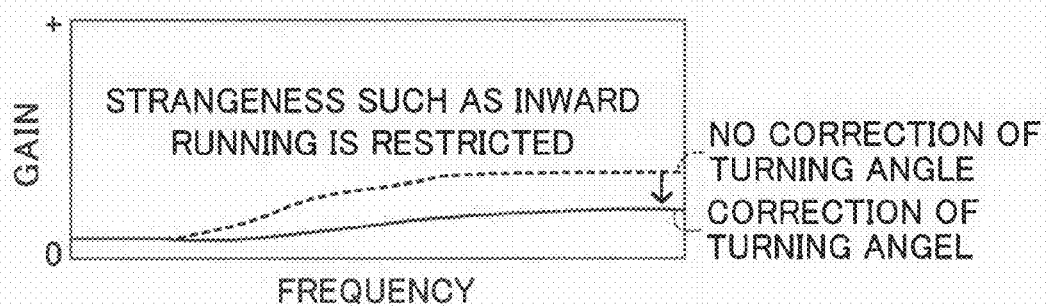
FIGS. 14A and 14B show views, respectively, for explaining the change of the frequency responsiveness property of the lateral acceleration generated in the vehicle in case that the target turning angle is corrected by the correction turning angle.
Figure 14B:
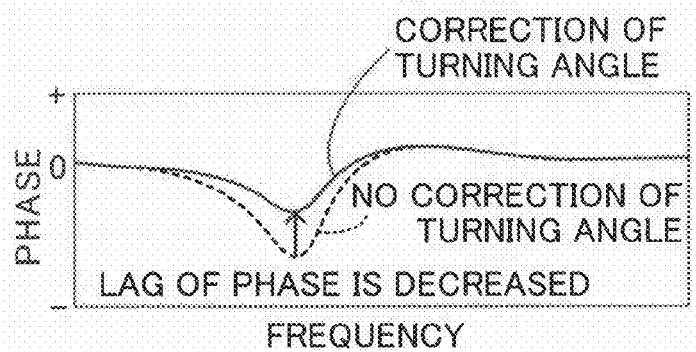

As explained above, in case that the target frequency responsiveness property $G_{gy}(0)$ is applied, as is obvious from FIG. 13, the change of the gain of the lateral acceleration $a_{gy}$ relative to the change of the frequency is restricted and the change property of the gain tends to be constant even when the vehicle speed V changes. Thereby, as shown by the solid line of FIG. 14A corresponding to FIG. 10A, in case that the target turning angle $\delta^*$ is corrected by applying the correction turning angle $\delta_c$ thereto at the low vehicle speed range, compared with the case that the target turning angle $\delta^*$ is not corrected at the low vehicle speed range as shown by the chain line, the strangeness such as the inward running felt by the driver due to the restriction of the increasing of the gain at the high frequency range can be improved. Further, as shown by the solid line of FIG. 14B corresponding to FIG. 10B, in case that the target turning angle $\delta^*$ is corrected by applying the correction turning angle $\delta_c$ thereto at the high vehicle speed range, compared with the case that the target turning angle $\delta^*$ is not corrected at the high vehicle speed range as shown by the chain line, the strangeness felt by the driver due to the lag of the generation of the lateral acceleration $a_{gy}$ by the restriction of the lag of the phase at the high frequency range can be improved.

As can be understood from the above explanation, according to the second embodiment, similar to the first embodiment, the correction turning angle calculation part 52 uses the transfer function $G_{gy}(s)$ which is the first transfer function and can set the frequency responsiveness property of the transfer function $G_{gy}(s)$, in particular, set the stationary component $G_{gy}(0)$ out of the responsiveness property of the gain of the lateral acceleration $a_{gy}$ generated in the vehicle relative to the change of the frequency of the actual turning angle $\delta$ as the target frequency responsiveness property, and can set the transfer function $K_{gy}(s)$, which is the second transfer function, by using the difference between the set target frequency responsiveness property $G_{gy}(0)$ and the transfer function $G_{gy}(s)$. Thereby, the transfer function $K_{gy}(s)$ is set in a reflection of the nonstationary component of the transfer function $G_{gy}(s)$, that is, the component which influences the directional stability and the responsiveness of the vehicle, and therefore the correction turning angle $\delta_c$ calculated by using this transfer function $K_{gy}(s)$ is calculated as a function for effectively correcting the component which influences the directional stability and the responsiveness of the vehicle.

Thereby, the change of the frequency responsiveness property of the lateral acceleration $a_{gy}$ generated in the vehicle, in particular, the change of the responsiveness property of the gain of the lateral acceleration $a_{gy}$ can be largely restricted by correcting the target turning amount $\delta^*$ by the correction turning angle $\delta_c$. That is, in this case, the frequency responsiveness property of the lateral acceleration $a_{gy}$ generated in the vehicle can be generally constant, and therefore the extremely appropriate directional stability and the extremely appropriate responsiveness can be ensured. Accordingly, the further appropriate directional stability and the further appropriate responsiveness on the turning of the vehicle can be obtained and regarding the change of the lateral acceleration $a_{gy}$ generated in the vehicle, the strangeness felt by the driver can be further largely restricted.

Further, the correction turning angle calculation part 52 can set the transfer function $K_{gy}(s)$ in consideration of the frequency responsiveness property of the lateral acceleration $a_{gy}$ of the vehicle which changes, depending on the vehicle speed V, and therefore the correction turning angle $\delta_c$ calculated by using the transfer function $K_{gy}(s)$ is calculated as an angle for restricting the strangeness such as the inward running at the low vehicle speed range to ensure the directional stability of the vehicle and appropriately correcting the responsiveness at the high vehicle speed range. Accordingly, the further appropriate directional stability and the further appropriate responsiveness can be obtained, depending on the vehicle speed V, and the strangeness felt by the driver can be largely decreased.

c. Third Embodiment

Figure 15:
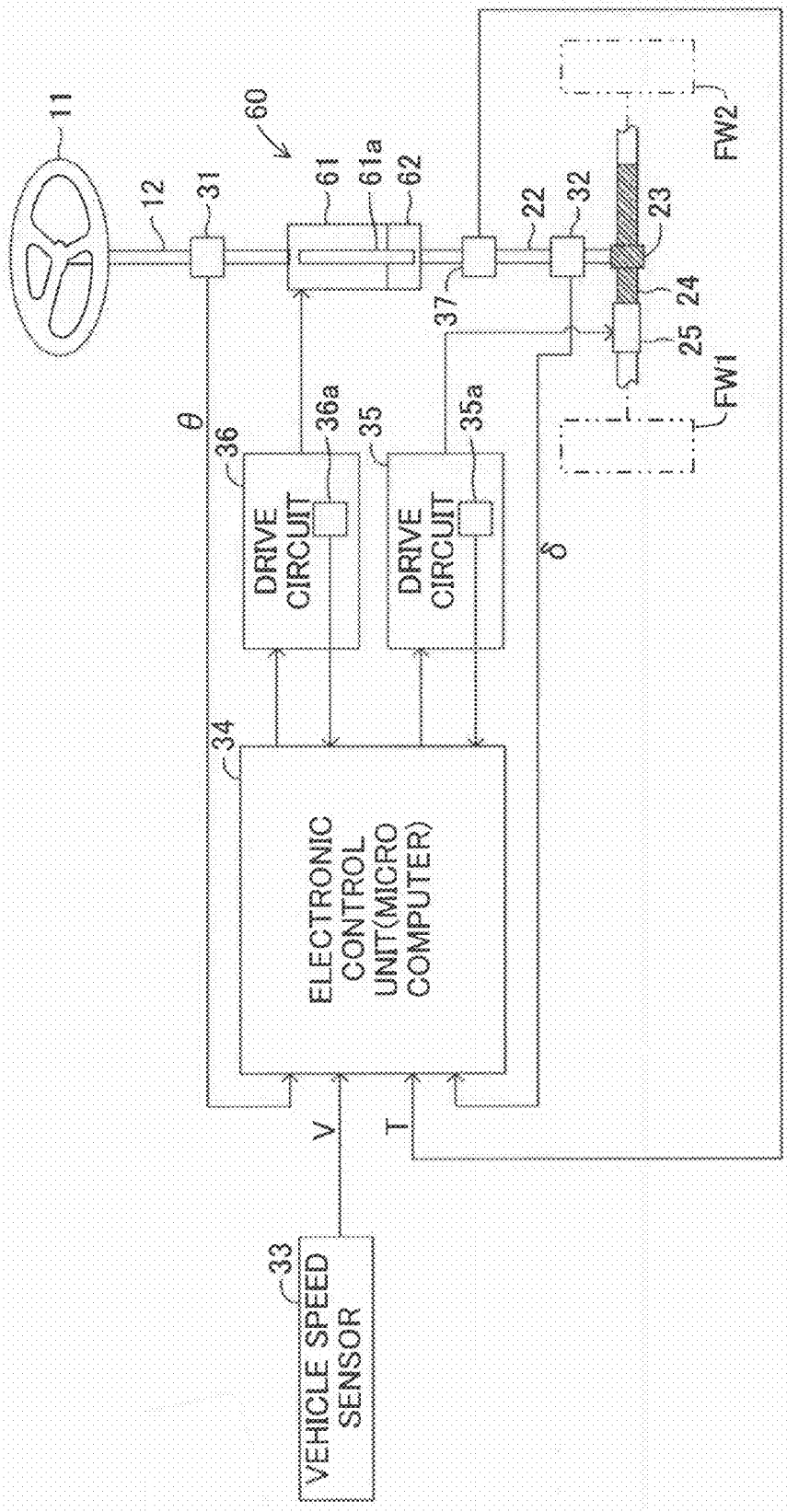
FIG. 15 shows a schematic view of a steering device of a vehicle of a third embodiment of the invention.

In the above-explained first and second embodiments, the steering-by-wire system, which the mechanical connection between the steering wheel 11 and the right and left front wheels FW1 and FW2 is released, is employed as the steering device of the vehicle. In this case, as shown in FIG. 15, the variable gear ratio steering device, which the steering gear ratio (the transmission ratio) can freely be adjusted, may be employed. Below, the third embodiment will be explained in detail, however, the same parts as those of the first and second embodiments are indicated by the same reference symbols as those of the first and second embodiments and the explanations thereof will be omitted.

In the steering device of the vehicle of the third embodiment, the reaction force actuator 13 and the turning actuator 21 of the first and second embodiments are omitted, and the steering force input shaft 12 and the turning force output shaft 22 are connected to each other by a variable gear ratio actuator 60. The variable gear ratio actuator 60 has an electric motor 61 and a reducer 62 and suitably changes the rotation amount (or rotation angle) of the turning force output shaft 22 connected to the reducer 62 relative to the rotation amount (or rotation angle) of the steering force input shaft 12.

The electric motor 61 is constituted such that a motor housing thereof is integrally connected to the steering force input shaft 12 and rotates integrally with the steering force input shaft 12 according to the rotation operation of the steering wheel 11 by the driver. Further, a drive shaft 61a of the electric motor 61 is connected to the reducer 62 and the rotation force of the electric motor 61 is transmitted to the reducer 62 via the drive shaft 61a. The reducer 62 is constituted by a prescribed gear mechanism (for example, a harmonic drive (registered trade mark) mechanism, a planetary gear mechanism, etc.) and the turning force output shaft 22 is connected to the gear mechanism. Thereby, when the rotation force of the electric motor 61 is transmitted to the reducer 62 via the drive shaft 61a, the reducer 62 suitably reduces the rotation of the drive shaft 61a by the prescribed gear mechanism to transmit the rotation to the turning force output shaft 22. Accordingly, the variable gear ratio actuator 62 relatively rotatably connects the steering input shaft 12 and the turning force output shaft 22 to each other by the drive shaft 61a of the electric motor 61 and can suitably change the ratio of the rotation amount (or the rotation angle) of the turning force output shaft 22 relative to the rotation amount (or the rotation angle) of the steering force input shaft 12, that is, can suitably change the steering gear ratio (the transmission ratio) of the rotation from the steering force input shaft 12 to the turning force output shaft 22 by the reducer 62.

Further, in the third embodiment, because of the omission of the reaction force actuator 13, an electric motor 25 is provided for reducing the operation force (the steering torque) input to the steering wheel 11 by the driver. Further, the torque (the assist torque) generated by the electric motor 25 is transmitted to the rack bar 24. Thereby, the rotation force of the turning force output shaft 22 is transmitted to the rack bar 24 via the pinion gear 23 and the assist torque of the electric motor 25 is transmitted to the rack bar 24. As explained above, the steering torque to be input to the steering wheel 11 by the driver can be reduced by the application of the assist torque by the electric motor 25.

Further, in the third embodiment, the electronic control device has a steering torque sensor 37. The steering torque sensor 37 has, for example, a resolver rotor which rotates along with a torsion bar and a resolver stator which is secured to the vehicle opposite to the resolver rotor, is assembled to the turning force output shaft 22 and detects the steering torque T input to the turning force output shaft 22 via the steering wheel 11 by the driver. It should be noted that the steering torque sensor 37 outputs the steering torque T as a positive value when the steering wheel 11 is rotated in the clockwise direction and the steering torque T as a negative value when the steering wheel 11 is rotated in the counter-clockwise direction.

Further, in the third embodiment, the drive circuit 35 connected to the electronic control unit 34 is modified such that it drives the electric motor 25 and the drive circuit 36 is modified such that it drives the electric motor 61 of the variable gear ratio actuator 60. It should be noted that in the third embodiment, the electric current detectors 35a and 36a for detecting the drive electric currents flowing in the electric motors 25 and 61 are provided in the drive circuits 35 and 36, respectively. Further, the drive electric currents detected by the electric current detector 35a and 36a are fed back to the electronic control unit 34.

In the third embodiment constituted as explained above, similar to the first and second embodiments, as shown in FIG. 2, the electronic control unit 34 is constituted by the reaction force control part 40 and the turning control part 50. It should be noted that in the third embodiment, the operation of the reaction force control part 40 does not directly relate to the present invention, and therefore they will be briefly explained below.

The target reaction force torque calculation part 41 inputs thereto the steering angle θ from the steering angle sensor 31, the vehicle speed V from the vehicle speed sensor 33 and the steering torque T from the steering torque sensor 37. Then, the target reaction force torque calculation part 41 determines a target reaction force torque Tz*, that is, an assist torque for decreasing the steering torque T to the target reaction force torque Tz*, depending on the magnitudes of the input steering angle θ, the input vehicle speed V and the input steering torque T.

The target reaction force torque Tz*, in other words, the assist torque calculated as explained above is supplied to the drive control part 42. Then, the drive control part 42 outputs a control signal (for example, a PWM control signal), which depends on the supplied assist torque, to the drive circuit 35 to flow the drive electric current, which depends on the assist torque, in the electric motor 25. Thereby, the electric motor 25 applies an assist torque to the rack bar 24, and as a result, a reaction force equal to the target reaction force torque Tz* is applied to the steering wheel 11 via the steering force input shaft 12. Accordingly, a suitable reaction force is applied to the rotation operation of the steering wheel 11 by the driver and the driver can lightly rotate the steering wheel 11, feeling the applied reaction force.

On the other hand, in the turning control part 50, the target turning angle calculation part 51, the correction turning angle calculation part 52 and the final target turning angle calculation part 53 operate, similar to the first and second embodiments. In this regard, the third embodiment is different from the first and second embodiments in the point that the drive control part 54 controls the drive of the electric motor 61 of the variable gear ratio actuator 60 in the third embodiment. That is, the drive control part 54 inputs thereto the supplied final target turning angle $\delta_d$ and the actual turning angle δ from the turning angle sensor 32, and calculates the difference $\Delta\delta(=\delta_d-\delta)$ between the final target turning angle $\delta_d$ and the actual turning angle δ. Then, the drive control part 54 calculates a target electric current i* proportional to the difference Δδ, inputs thereto the target electric current i* and the actual electric current i detected by the electric current detector 36a, which current flows in the electric motor 61 in the variable gear ratio actuator 60, and calculates the difference Δi(=i*−i) therebetween.

Further, the drive control part 54 adds the proportional term proportional to the calculated difference Δi to the integral term obtained by integrating the differences Δi and calculates a target voltage v* for driving the electric motor 61 such that the difference Δi becomes zero. Then, the drive control part 54 outputs a PWM control voltage signal corresponding to the target voltage v* to the drive circuit 36. The drive circuit 36 switches the switching element on and off at the duty ratio corresponding to the PWM control voltage signal to apply the target voltage v* to the electric motor 61. Thereby, the right and left front wheels FW1 and FW2 are turned to the final target turning angle $\delta_d$ by the drive force of the electric motor 61.

As explained above, also in the third embodiment, the target turning angle δ* is corrected by the correction turning angle $\delta_c$ and the right and left front wheels FW1 and FW2 can be turned to the corrected final target turning angle $\delta_d$. Accordingly, the same effects as those of the first and second embodiments can be obtained.

d. Modified Example

In the above-explained first embodiment, the change of the transient responsiveness property of the yaw rate γ is restricted and therefore, in particular, the appropriate directional stability of the vehicle at the high vehicle speed range is ensured. On the other hand, in the above-explained second embodiment, the change of the transient responsiveness property of the lateral acceleration $a_{gy}$ is restricted and therefore, in particular, the strangeness such as the inward running felt by the driver at the low vehicle speed range is appropriately restricted. Accordingly, the restriction of the change of the transient responsiveness property of the yaw rate γ and the restriction of the change of the transient responsiveness property of the lateral acceleration $a_{gy}$ can be selectively performed, depending on the magnitude of the vehicle speed V, that is, the vehicle speed range.

As will be concretely explained, in the vehicle which the turning angle is not corrected, the change of the transient responsiveness property of the yaw rate γ, that is, the changes of the gain and the phase relative to the change of the frequency are relatively small at the middle vehicle speed range as shown in FIG. 4A. Further, in the vehicle which the turning angle is not corrected, the change of the transient responsiveness property of the lateral acceleration $a_{gy}$, that is, the changes of the gain and the phase relative to the change of the frequency are also relatively small at the middle vehicle speed range as shown in FIG. 10A.

Accordingly, for example, at the low vehicle speed range that the vehicle speed input from the vehicle speed sensor 33 is low, similar to the second embodiment, the electronic control unit 34 determines the transfer function $K_{gy}(s)$, which has as an input the target turning rate $\delta^{*\prime}$ and as an output the correction turning angle $\delta_c$, by using the difference between the transfer function $G_{gy}(s)$ determined by the correction turning angle calculation part 52, which transfer function has as an input the turning angle δ and as an output the lateral acceleration $a_{gy}$, and the stationary component $G_{gy}(0)$ of the transfer function $G_{gy}(s)$. Then, the correction turning angle $\delta_c$, which depends on the target turning rate $\delta^{*\prime}$, is calculated by using the transfer function $K_{gy}(s)$. Thereby, the change of the transient responsiveness property of the lateral acceleration $a_{gy}$ can be restricted and the strangeness such as the inward running felt by the driver at the low vehicle speed range can be effectively restricted.

Further, at the middle vehicle speed range that the vehicle speed V input from the vehicle speed sensor 33 is relative high, the electronic control unit 34 switches the restriction of the change of the transient responsiveness property of the lateral acceleration $a_{gy}$ to the restriction of the change of the transient responsiveness property of the yaw rate γ. Thereby, at the middle and high vehicle speed ranges, similar to the first embodiment, the electronic control unit 34 determines the transfer function K(s), which has as an input the target turning rate $\delta^{*\prime}$ and as an output the correction turning angle $\delta_c$, by using the difference between the transfer function G(s) determined by the correction turning angle calculation part 52 and indicating the transient responsiveness property, which transfer function has as an input the turning angle δ and as an output the yaw rate γ, and the stationary component G(0) of the transfer function G(s). Then, the correction turning angle $\delta_c$, which depends on the target turning rate $\delta^{*\prime}$, is calculated by using the transfer function K(s). Thereby, the change of the transient responsiveness property of the yaw rate γ can be restricted and the appropriate directionally stability of the vehicle at the high vehicle speed range can be ensured.

As explained above, the correction turning angle $\delta_c$ is calculated while the restriction of the change of the transient responsiveness property of the yaw rate γ and the restriction of the change of the transient responsiveness property of the lateral acceleration $a_{gy}$ are selectively switched, and the target turning angle $\delta^*$ is corrected, and therefore it is possible and preferred to effectively decrease the strangeness, which is felt by the driver and depends on the vehicle speed V.

When embodying the present invention, the invention is not limited to the first to third embodiments and the modified example, and various modifications can be employed without departing from the object of the invention.

For example, in the first and second embodiments, the turning actuator 21 turns the right and left front wheels FW1 and FW2 to the final target turning angle $\delta_d$ via the turning force output shaft 22. Further, in the third embodiment, the variable gear ratio actuator 60 turns the right and left front wheels FW1 and FW2 to the final target turning angle $\delta_d$ via the turning force output shaft 22.

In this regard, for example, as shown in FIG. 15, when the steering device of the vehicle has the electric motor 25 and the steering torque sensor 37, the turning angle δ of the right and left front wheels FW1 and FW2 can be corrected by the correction turning angle $\delta_c$ without using the turning actuator 21 or the variable gear ratio actuator 60.

That is, as explained above, the steering torque sensor 37 has the torsion bar, and therefore it can be slightly twisted. Accordingly, for example, within the range that the torsion bar can be twisted by the drive of the electric motor 25, the turning angle δ of the right and left front wheels FW1 and FW2 can be corrected by the correction turning angle $\delta_c$. However, in this case, generally, when the amount of the twisting of the torsion bar increases, the large steering torque T is detected and as a result, as explained in the third embodiment, the assist torque generated by the electric motor 25 increases. Accordingly, for example, when the electronic control unit 34 corrects the turning angle δ by using the twisting of the torsion bar, it is preferred that the electronic control unit 34 temporarily ceases the generation of the assist torque by the electric motor 25 such that the wrong assist torque is not applied. Thereby, compared with the first to third embodiments, the effect is slightly decreased, however, the turning angle δ of the right and left front wheels FW1 and FW2 can be corrected and the strangeness felt by the driver can be restricted.

Further, in the first to third embodiments, the steering wheel 11, which is rotated for steering the vehicle, is employed. However, in place of this, for example, a joystick type of the steering wheel, which is linearly displaced, may be employed, and other type of the steering wheel, which is operated by the driver and can command the steering to the vehicle, may be employed.

Further, in the first and second embodiments, the right and left front wheels FW1 and FW2 are turned by rotating the turning force output shaft 22 by using the turning actuator 21. However, in place of this, the right and left front wheels FW1 and FW2 may be turned by linearly displacing the rack bar 24 by using the turning actuator 21.

The invention claimed is:
1. A steering device of a vehicle having a steering wheel to be operated by a driver in order to steer said vehicle and turning means for turning wheels to be turned, depending on the operation of said steering wheel, comprising:

operation input value detection means for detecting an operation input value of said driver to said steering wheel;

target turning amount calculation means for calculating a target turning amount of said wheels to be turned by using said operation input value detected by said operation input value detection means, said target turning amount having a predetermined relationship with said operation input value to said steering wheel;

transfer function setting means for setting a second transfer function by using a first transfer function determined on the basis of the specification of said vehicle, said first transfer function having as an input a turning amount of said wheels to be turned and as an output a motion condition amount generated in said vehicle by the turning of said wheels to be turned, said second transfer function having as an input a target turning rate indicating a temporal change of said target turning amount calculated by said target turning amount calculation means and as an output a turning amount of said wheels to be turned which are turned at said target turning rate;

correction turning amount calculation means for calculating a correction turning amount by using said second transfer function set by said transfer function setting means and said target turning rate, said correction turning amount correcting the change of the motion condition amount generated in said vehicle when said wheels to be turned are turned by said target turning amount calculated by said target turning amount calculation means;

final target turning amount calculation means for calculating a final target turning amount by adding said correction turning amount calculated by said correction turning amount calculation means to said target turning amount calculated by said target turning amount calculation means; and turning control means for turning said wheels to be turned, depending on said final target turning amount calculated by said final target turning amount calculation means.

2. The steering device of the vehicle as set forth in claim 1, wherein said transfer function setting means sets a stationary component out of a frequency responsiveness property of said first transfer function as a target frequency responsiveness property and sets said second transfer function by using a difference between said set target frequency responsiveness property and a frequency responsiveness property of said first transfer function.

3. The steering device of the vehicle as set forth in claim 2, wherein said frequency responsiveness property of said first transfer function is a responsiveness property of a gain of the motion condition amount generated in said vehicle in response to a change of a frequency of the turning amount of said wheels to be turned.

4. The steering device of the vehicle as set forth in claim 1, further comprising vehicle speed detection means for detecting a speed of said vehicle, wherein said transfer function setting means sets said second transfer function by using the vehicle speed detected by said vehicle speed detection means.

5. The steering device of the vehicle as set forth in claim 1, wherein the motion condition amount generated in said vehicle is one of a yaw rate of said vehicle and a lateral acceleration of said vehicle.

6. The steering device of the vehicle as set forth in claim 5, further comprising vehicle speed detection means for detecting a speed of said vehicle, wherein said transfer function setting means determines said first transfer function by replacing said motion condition amount of said vehicle with one of the yaw rate of said vehicle and the lateral acceleration of said vehicle, depending on the vehicle speed detected by said vehicle speed detection means.

7. The steering device of the vehicle as set forth in claim 6, wherein said transfer function setting means determines the lateral acceleration of said vehicle as said motion condition amount of said vehicle when said vehicle runs at a low vehicle speed range that the vehicle speed detected by said vehicle speed detection means is low, while said transfer function setting means determines the yaw rate of said vehicle as said motion condition amount of said vehicle when said vehicle runs at a high vehicle speed range that the vehicle speed detected by said vehicle speed detection means is high.

8. The steering device of the vehicle as set forth in claim 1, wherein a mechanical connection between said steering wheel and said turning means is released and said turning control means controls the drive of an actuator for actuating said turning means to turn said wheels to be turned by said final target turning amount.

9. The steering device of the vehicle as set forth in claim 1, wherein said steering wheel and said turning means are connected to each other by changing means for changing a ratio of said turning amount of said wheels to be turned relative to said operation input value to said steering wheel and said turning control means controls the actuation of said changing means to turn said wheels to be turned by said final target turning amount.

10. The steering device of the vehicle as set forth in any of claims 8 and 9, further comprising vehicle speed detection means for detecting a speed of said vehicle, wherein said target turning amount calculation means calculates a target turning amount to increase a ratio of said turning amount of said wheels to be turned relative to the operation input value detected by said operation input value detection means when said vehicle runs at a low vehicle speed range that the vehicle speed detected by said vehicle speed detection means is low, while said target turning amount calculation means calculates a target turning amount to decrease the ratio of said turning amount of said wheels to be turned relative to said detected operation input value when said vehicle runs at a high vehicle speed range that the vehicle speed detected by said vehicle speed detection means is high.

* * * * *